United States Patent
Barbarossa et al.

(10) Patent No.: US 7,693,364 B2
(45) Date of Patent: Apr. 6, 2010

(54) APPARATUS, SYSTEM AND METHOD FOR A TUNABLE OPTICAL FILTER

(75) Inventors: Giovanni Barbarossa, Saratoga, CA (US); Ming Li, Pleasonton, CA (US); Song Peng, Pleasanton, CA (US)

(73) Assignee: Oclaro (North America), Inc., Fremont, CA (US)

( * ) Notice: Subject to any disclaimer, the term of this patent is extended or adjusted under 35 U.S.C. 154(b) by 156 days.

(21) Appl. No.: 11/857,892

(22) Filed: Sep. 19, 2007

(65) Prior Publication Data
US 2008/0008475 A1 Jan. 10, 2008

Related U.S. Application Data

(62) Division of application No. 11/198,721, filed on Aug. 5, 2005, now Pat. No. 7,280,720.

(60) Provisional application No. 60/599,480, filed on Aug. 6, 2004.

(51) Int. Cl.
*G02B 6/28* (2006.01)
*H04J 14/02* (2006.01)

(52) U.S. Cl. ............... 385/24; 385/16; 385/37; 398/83; 398/85

(58) Field of Classification Search ............ 385/11, 385/16, 24, 37; 398/83, 85, 86
See application file for complete search history.

(56) References Cited

U.S. PATENT DOCUMENTS

| 5,233,453 | A | * | 8/1993 | Sivarajan et al. | 398/55 |
| 5,701,371 | A | * | 12/1997 | Ishida | 385/17 |
| 7,010,228 | B2 | * | 3/2006 | Li et al. | 398/83 |
| 7,031,060 | B2 | * | 4/2006 | Mao et al. | 359/494 |

* cited by examiner

*Primary Examiner*—Hemang Sanghavi
(74) *Attorney, Agent, or Firm*—Patterson & Sheridan, L.L.P.

(57) ABSTRACT

A tunable optical filter comprises an optical switch having a single first optical port and a plurality of second optical ports; a plurality of band pass filters, each one of the band pass filters optically coupled to a respective second optical port; and an optical multiplexer having a plurality of inputs and a single output, each input optically coupled to a respective band pass filter, wherein the optical switch delivers a plurality of optical channels to a selected one of the band pass filters, the selected band pass filter transmitting a single selected optical channel to an input of the optical multiplexer. Alternatively, the multiplexer may be substituted by a second optical switch. Optionally, the band pass filters may reflect other channels back to the plurality of second optical ports.

8 Claims, 27 Drawing Sheets

APPARATUS, SYSTEM AND METHOD FOR A TUNABLE OPTICAL FILTER

CROSS-REFERENCE TO RELATED APPLICATIONS

This application is a divisional of U.S. patent application Ser. No. 11/198,721, filed Aug. 5, 2005 now U.S. Pat. No. 7,280,720, which claims benefit of U.S. provisional patent application Ser. No. 60/599,480, filed Aug. 6, 2004. Each of the aforementioned related patent applications is herein incorporated by reference.

BACKGROUND OF THE INVENTION

1. Field of the Invention

The present invention relates to tunable optical filters and re-configurable optical channel dropping de-multiplexers utilized in optical communications systems. More particularly, the present invention relates to a tunable filter and re-configurable optical channel dropping de-multiplexer wherein a selected wavelength channel from among a plurality of channels comprising a wavelength division multiplexed composite optical signal is delivered to a desired port.

2. Description of the Related Art

Optical fibers are used extensively in telecommunications systems. It is often necessary to add or drop a wavelength channel in optical links or systems. Channel dropping can be achieved by a tunable filter or a re-configurable channel dropping de-multiplexer. Such a tunable filter or re-configurable de-multiplexer receives, from an input port, a wavelength division multiplexed composite optical signal that comprises several channels, or "wavelengths". These plural channels may include one or more "dropped channels" or wavelengths that a user wishes to remove, or "drop" to selected local channel drop ports, and, optionally, other "express" channels that the user wishes to send, as a wavelength division multiplexed composite optical signal, to another destination.

SUMMARY OF THE INVENTION

An improved apparatus, system and method for a tunable filter and a re-configurable optical channel dropping de-multiplexer are herein disclosed. An exemplary preferred embodiment of a tunable filter in accordance with the present invention comprises a polarizing input port, a polarizing output port, a first and a second single-walk-off birefringent walk-off plate, a first and a second double-walk-off birefringent walk-off plate, a first polarization modulator optically coupled between the polarizing input port and the first single-walk-off birefringent walk-off plate, a second polarization modulator optically coupled between the first single-walk-off birefringent walk-off plate and the first double-walk-off birefringent walk-off plate, a plurality of optical filters, each filter transmitting a different respective wavelength channel, optically coupled between the first and second double-walk-off birefringent walk-off plates, a third polarization modulator optically coupled between the second double-walk-off birefringent walk-off plate and the second single-walk-off birefringent walk-off plate and a fourth polarization modulator optically coupled between the second single-walk-off birefringent walk-off plate and the polarizing output port.

A first preferred method in accordance with the present invention comprises the steps of (a) receiving a plurality of WDM channels at an input of an optical switch, (b) switching the plurality of channels to a selected one of a plurality of outputs of the optical switch, (c) routing the plurality of channels to a channel band pass filter optically coupled to the selected switch output, (d) transmitting the single channel through the channel band pass filter to the input of a multiplexer optically coupled to the channel band pass filter and (e) routing the single transmitted channel, within the multiplexer, to the multiplexer output.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
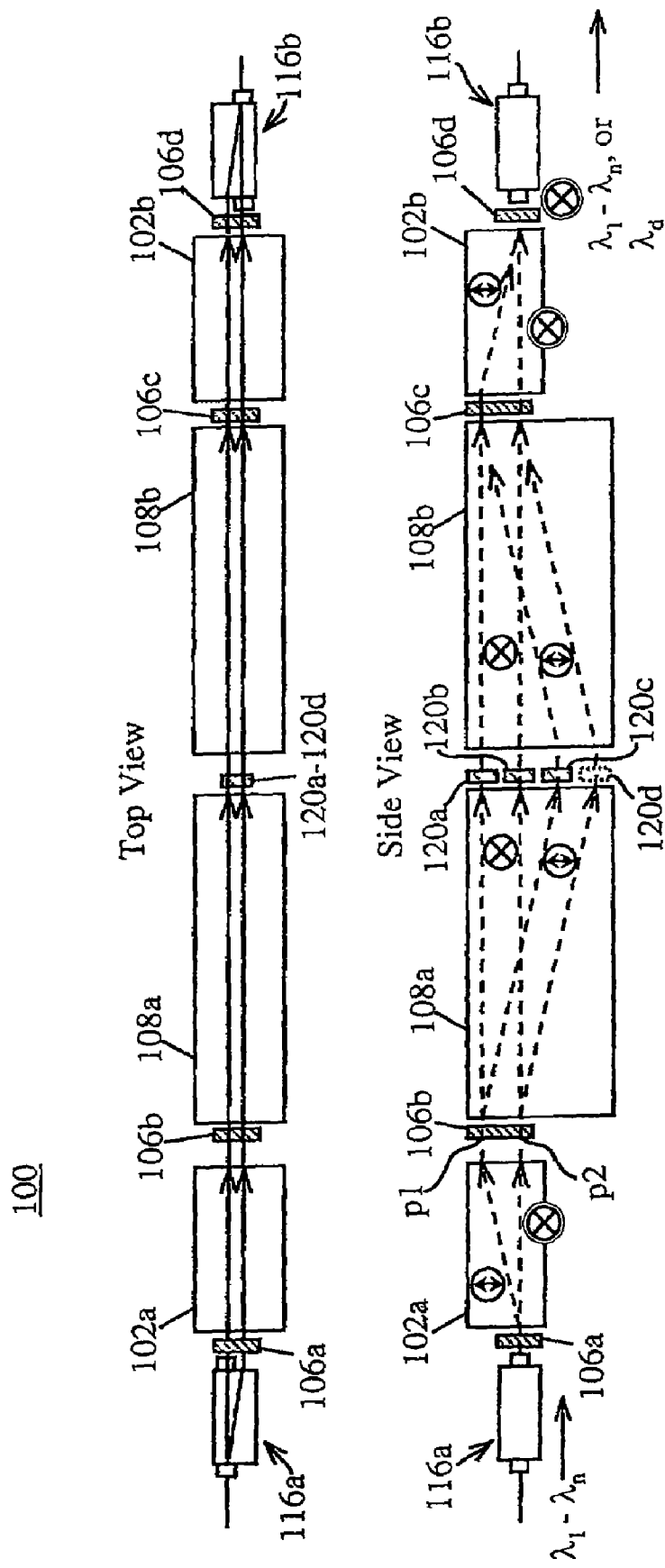
FIG. 1A is an illustration of a first preferred embodiment of a tunable filter in accordance with the present invention.

The present invention provides an apparatus, system and method for tunable optical filter and a re-configurable optical channel dropping de-multiplexer. The following description is presented to enable one of ordinary skill in the art to make and use the invention and is provided in the context of a patent application and its requirements. Various modifications to the preferred embodiments will be readily apparent to those skilled in the art and the generic principles described herein may be applied to other embodiments. Thus, the present invention is not intended to be limited to the embodiments shown but is to be accorded the widest scope consistent with the principles and features described herein. In order to gain a detailed understanding of the construction and operation of the present invention, the reader is referred to the appended FIGS. 1-13 in con junction with the following description.

Reference is first made to FIGS. 9-12 to illustrate the general operating principles and methods for tunable filtering in accordance with the present invention. These general operating principles will be applied to the discussion of specific apparatus later in this document. FIG. 9A schematically illustrates a first tunable filter in accordance with the present invention. The tunable filter 20 shown in FIG. 9A comprises an input 902, an optical switch 904 optically coupled to the input 902, a plurality of channel band pass filters 906a-906d optically coupled to the optical switch, an optical multiplexer 908 optically coupled to the plurality of channel band pass filters 906a-906d and an optical output 910 optically coupled to the optical multiplexer 908. Optionally, to simplify optical alignment and assembly, one could replace the entire group of band pass filters 906a-906d by a single conventional graded optical filter (not shown in FIG. 9A) wherein the central wavelength of the pass band transmitted through the filter varies along the length of the filter. The optical transmission properties of the single graded optical filter would vary such that the channel $\lambda_1$ would be the only channel transmitted therethrough at the position of the topmost horizontal dashed line, such that the channel $\lambda_2$ would be the only channel transmitted at the position of the second horizontal dashed line, such that the channel $\lambda_3$ would be the only channel transmitted at the position of the third horizontal dashed line, etc.

Figure 9A:
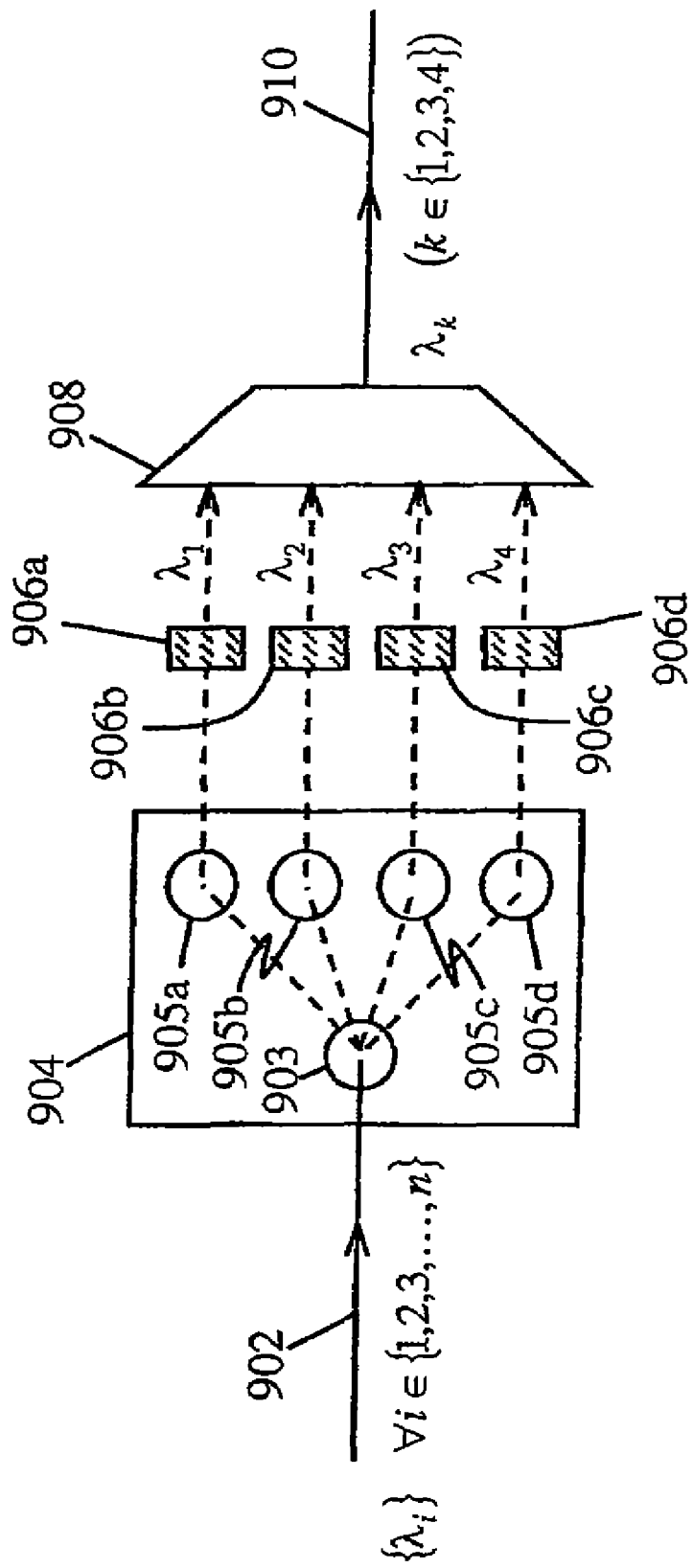
FIG. 9A is a diagram showing, in schematic fashion, a first tunable filter in accordance with the present invention.

In FIG. 9A, the optical switch 904 is shown as a 1×4 switch, such as a switch with a single switch input 903 and four alternative switch outputs 905a-905d. Each one of the outputs 905a-905d is optically coupled to a single respective one of the optical channel band pass filters 906a-906d. Alternative pathways of optical signals passing through the tunable filter 20 are illustrated with dashed lines. Only one such pathway is operative at any given time. Each channel band pass filter transmits or passes therethrough a different respective optical channel and prevents transmission of all other channels therethrough. In the example shown in FIG. 9A, the first, second, third and fourth channel band pass filter respectively transmits the channel $\lambda_1$, $\lambda_2$, $\lambda_3$ and $\lambda_4$. Depending upon which pathway is operative. in accordance with the switch state of the optical switch 904, an input composite optical signal will either be routed to the first 906a, second 906b, third 906c or fourth 906d channel band pass filter. Depending upon which one of these filters is encountered, either the channel $\lambda_1$, the channel $\lambda_2$, the channel $\lambda_3$ or the channel $\lambda_4$ is passed through to the optical multiplexer 908. Only one such channel is so passed at any particular time, in accordance with the switch state of the optical switch 904. The optical multiplexer, through a well-known operational capability, then routes the received channel to the optical output 910. Although, in the example of FIG. 9A, the optical switch 904 is shown as a 1×4 switch, the optical switch 904 is not to be regarded as being restricted to four or to any other particular number of outputs.

Figure 9B:
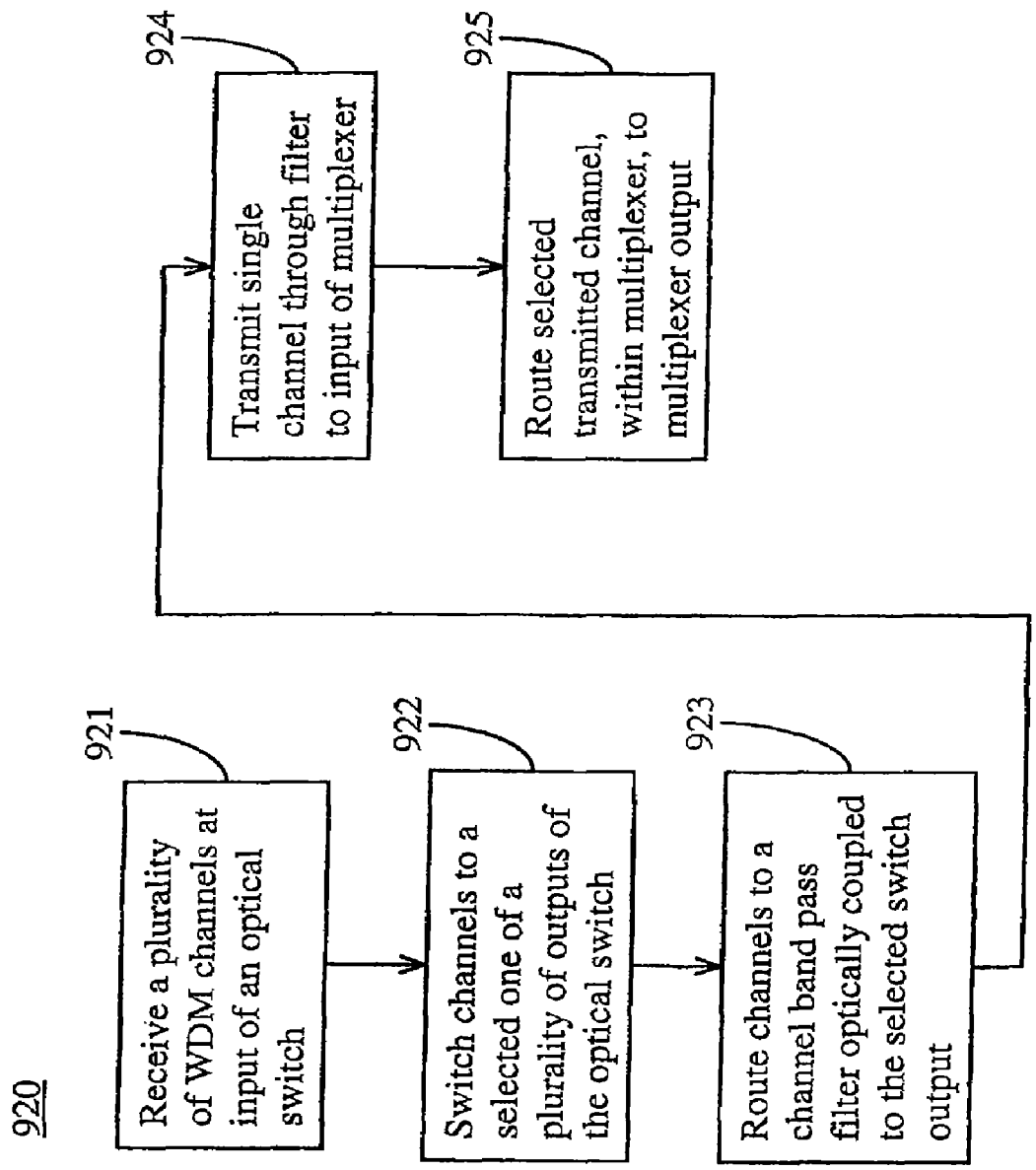
FIG. 9B is a flow chart of a first method of operation of a tunable filter in accordance with the present invention.

FIG. 9B is a flow chart of a first method of operation of a tunable filter in accordance with the present invention. The method 920 illustrated in FIG. 9B comprises a first step 921 that comprises receiving a plurality of WDM channels at an input of an optical switch. The method 920 then proceeds to the step 922 in which all of the channels are switched to a selected one of a plurality of outputs of the optical switch. The method 920 then proceeds to the step 923 in which all of the channels are routed from the selected switch output to a channel band pass filter optically coupled to the selected switch output. The method 920 then proceeds to the step 924 in which only a single selected channel is transmitted through the filter and then to one of a plurality of inputs of an optical multiplexer that is optically coupled to the filter. The multiplexer input that is optically coupled to the filter is the one that customarily receives an optical channel of the wavelength transmitted by the filter. Finally, the method 920 then proceeds to the step 925 in which the selected channel is transmitted, within the multiplexer, to the multiplexer output.

Figure 10A:
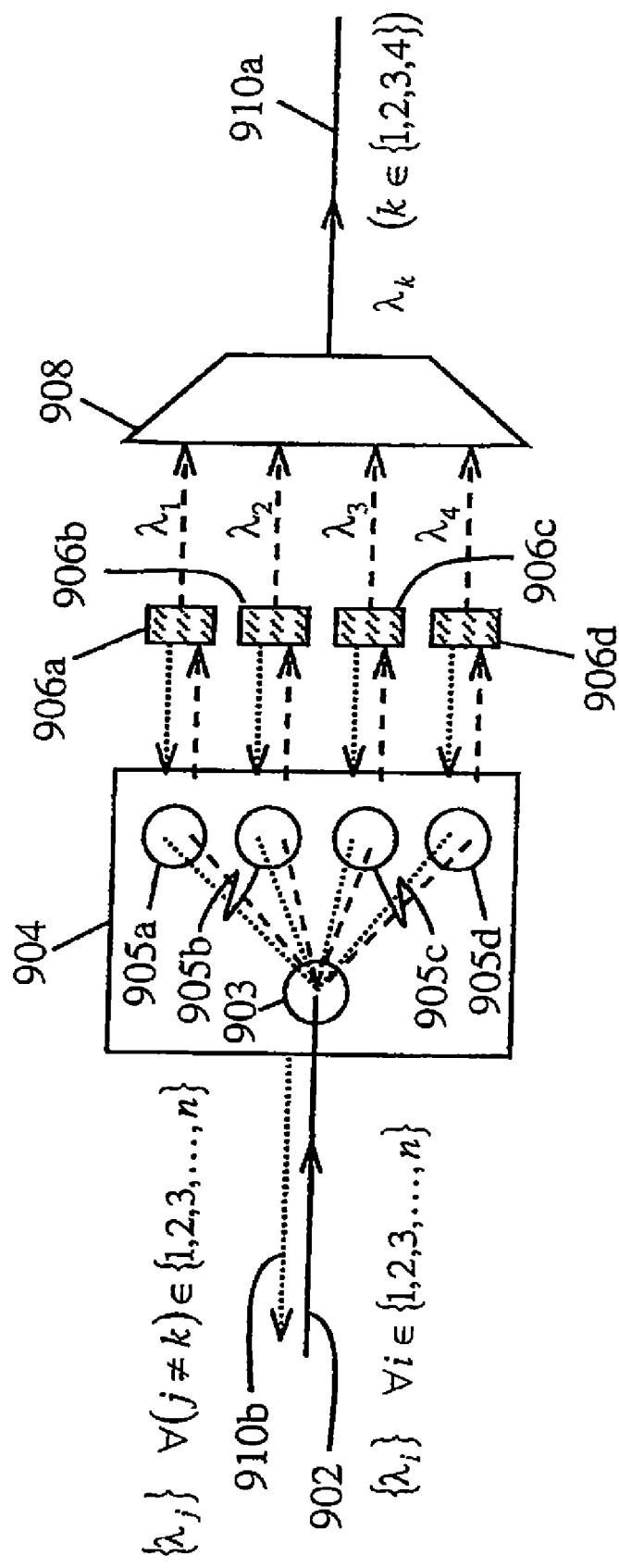
FIG. 10A is a diagram showing. in schematic fashion, a second tunable filter in accordance with the present invention, the second tunable filter further operating as a re-configurable channel dropping de-multiplexer.

FIG. 10A schematically illustrates a second tunable filter in accordance with the present invention, the tunable filter operating as a re-configurable channel dropping de-multiplexer. The re-configurable channel dropping de-multiplexer 30 shown in FIG. 10A comprises all the elements already illustrated in and discussed with reference to FIG. 9A except that a first optical output 90a is optically coupled to the optical multiplexer 908 and a further second optical output 910b is optically coupled to the optical switch 904. The re-configurable channel dropping de-multiplexer 30 (FIG. 10A) comprises the same previously described property of passing only one particular channel, depending upon the switch state of the optical switch 904, through to the optical multiplexer 908 and thence to the first optical output 910a. Additionally, each one of the channel band pass filters 906a-906d reflects all channels not transmitted through the filter back to the optical switch 904. For instance, this property is well known if each of the channel band pass filters 906a-906d is a thin-film filter. The reflected channels then return through the optical switch 904a back to the switch input 903 and then to the second output 910b. These reflected channels comprise all the original channels that were originally received from the optical input except for the particular channel that is passed through to the first optical output 910a. The particular angular alignments of the channel band pass filters 906a-906d may cause these reflected channels to return to the second output 910b instead of back to the optical input 902. Optionally, to simplify optical alignment and assembly, one could replace the entire group of band pass filters 906a-906d by a single conventional graded optical filter (not shown in FIG. 10A) wherein the central wavelength of the pass band transmitted through the filter varies along the length of the filter.

Figure 10B:
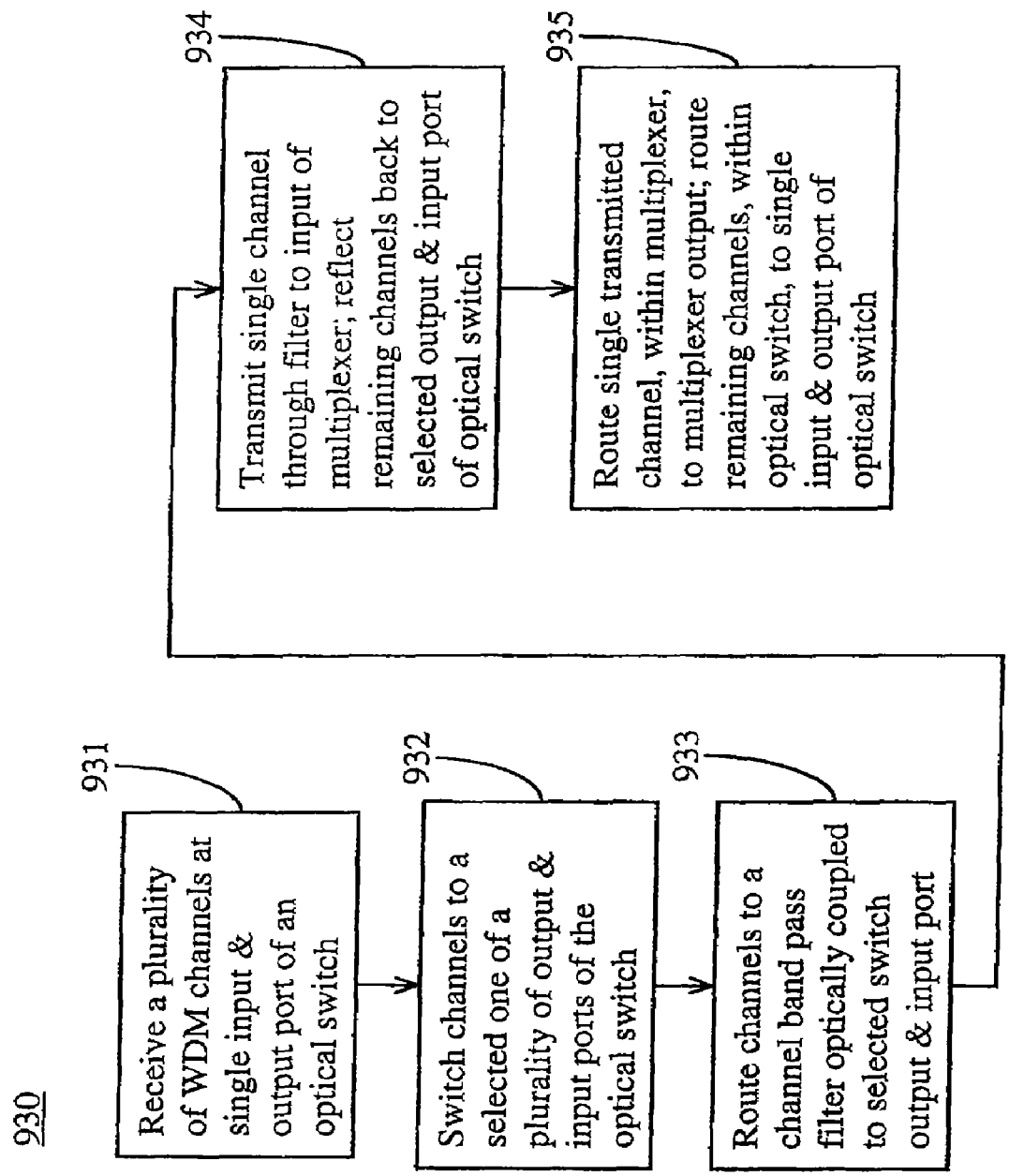
FIG. 10B is a flow chart of a second method of operation of a tunable filter in accordance with the present invention, wherein the tunable filter further operates as a re-configurable channel dropping de-multiplexer.

FIG. 10B is a flow chart of a second method of operation of a tunable filter in accordance with the present invention, the tunable filter operating as a re-configurable channel dropping de-multiplexer. The method 930 illustrated in FIG. 10B comprises a first step 931 that comprises receiving a plurality of WDM channels at the single input and output port of an optical switch. This port is referred to as an "input and output port" because it both receives the WDM channels as input and outputs the express channels. The method 930 then proceeds to the step 932 in which all of the channels are switched to a selected one of a plurality of output and input ports of the optical switch. These ports are referred to as "output and input ports" because they both output the WDM channels receive the express channels as input. The method 930 then proceeds to the step 933 in which all of the channels are routed from the selected switch output and input port to a channel band pass filter optically coupled to the selected switch port. The method 930 then proceeds to the step 934 in which only a single selected channel is transmitted through the filter to one of a plurality of inputs of an optical multiplexer optically coupled to the filter and in which the remaining channels are reflected back to the selected output and input port of the optical switch. The multiplexer input that is optically coupled to the filter is the one that customarily receives an optical channel of the wavelength transmitted by the filter. Finally, the method 930 then proceeds to the step 935 in which the selected channel is transmitted, within the multiplexer, to the multiplexer output and in which the remaining channels are routed, within the optical switch, to the single input and output port of the optical switch.

Figure 11A:
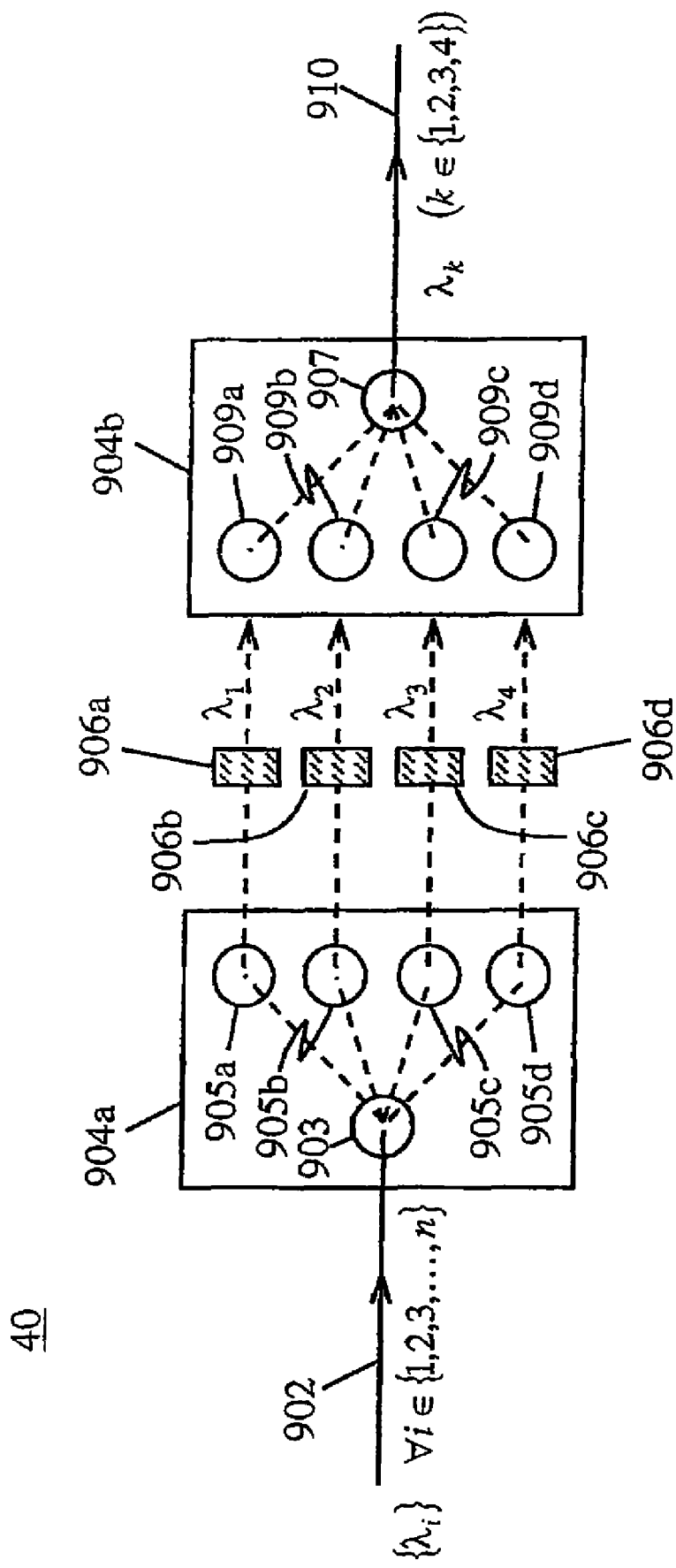
FIG. 11A is a diagram showing, in schematic fashion, a third tunable filter in accordance with the present invention.

FIG. 11A schematically illustrates a third tunable filter in accordance with the present invention. The tunable filter 40 shown in FIG. 11A comprises an input 902, a first optical switch 904a optically coupled to the input 902, a plurality of channel band pass filters 906a-906d optically coupled to the first optical switch 904a, a second optical switch 904b optically coupled to the plurality of channel band pass filters 906a-906d and an optical output 910 optically coupled to the second optical switch 904b. The tunable filter 40 provides the same switch-selectable single-channel output to the optical output 910 as previously described in reference to the tunable filter 20 (FIG. 9A). However, the tunable filter 40 (FIG. 11A) utilizes a second optical switch 904b instead of a multiplexer to route a selected channel to the optical output 910. The optical switch comprises, for instance, four alternative switch inputs 909a-909d and a single switch output 907, wherein each one of the switch inputs 909a-909d is optically coupled to a respective one of the channel band pass filters 906a-906d and wherein the switch output 907 is optically coupled to the optical output 910. The operation of the second switch 904b must be coordinated with that of the first switch 904a to ensure that the one particular channel received from one of the plurality of channel band pass filters 906a-906d is correctly routed to the optical output 910. Optionally, to simplify optical alignment and assembly, one could replace the entire group of band pass filters 906a-906d by a single conventional graded optical filter (not shown in FIG. 11A) wherein the central wavelength of the pass band transmitted through the filter varies along the length of the filter.

Figure 11B:
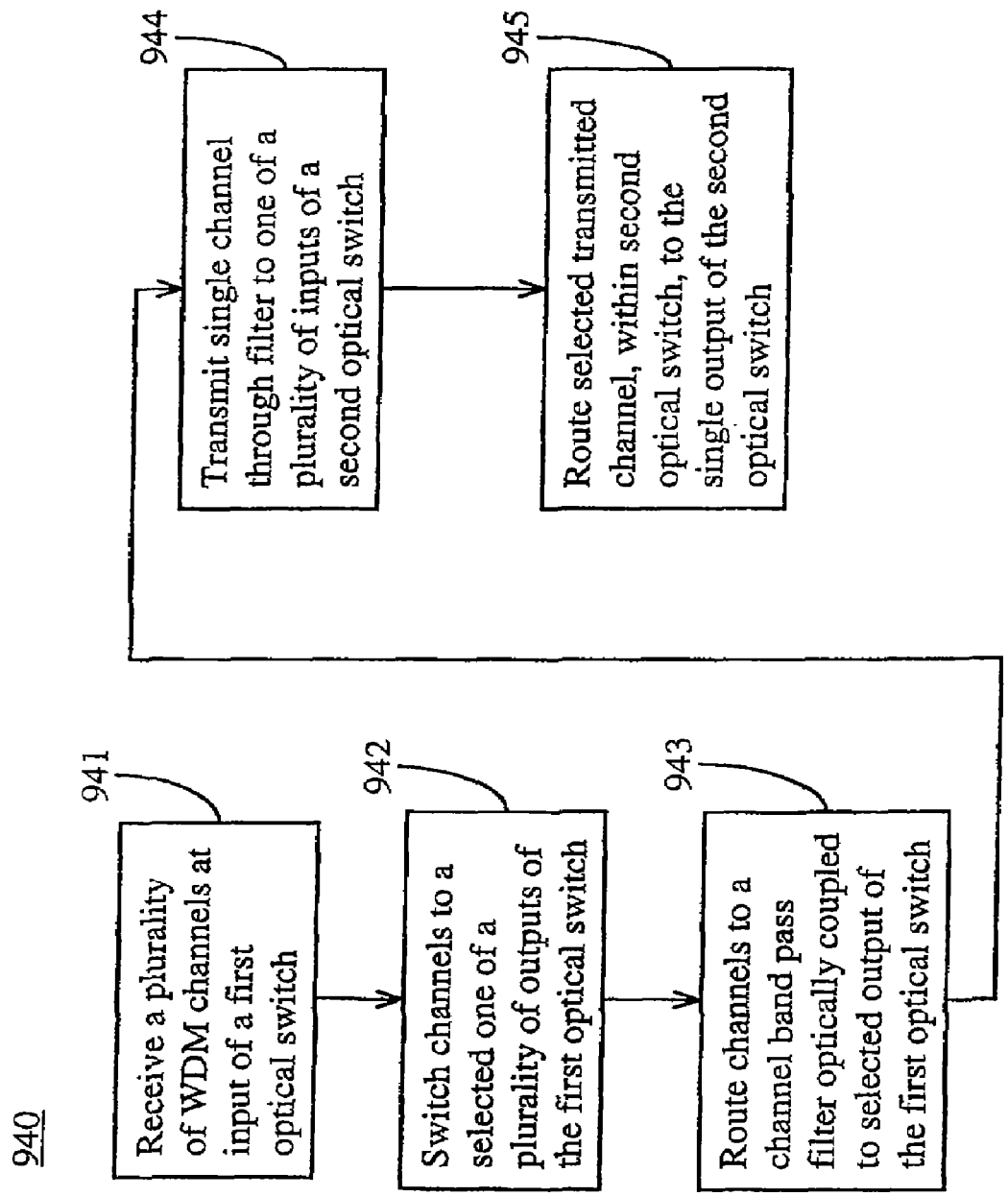
FIG. 11B is a flow chart of a third method of operation of a tunable filter in accordance with the present invention.

FIG. 11B is a flow chart of a third method of operation of a tunable filter in accordance with the present invention. The method 940 illustrated in FIG. 11B comprises a first step 941 that comprises receiving a plurality of WDM channels at the single input of a first optical switch. The method 940 then proceeds to the step 942 in which all of the channels are switched to a selected one of a plurality of outputs of the first optical switch. The method 940 then proceeds to the step 943 in which all of the channels are routed from the selected switch output to a channel band pass filter optically coupled to the selected output of the first optical switch. The method 940 then proceeds to the step 944 in which only a single selected channel is transmitted through the filter and then to one of a plurality of inputs of a second optical switch that is optically coupled to the filter. Finally, the method 940 then proceeds to the step 945 in which the selected channel is transmitted, within the second optical switch, to the single switch output.

Figure 12A:
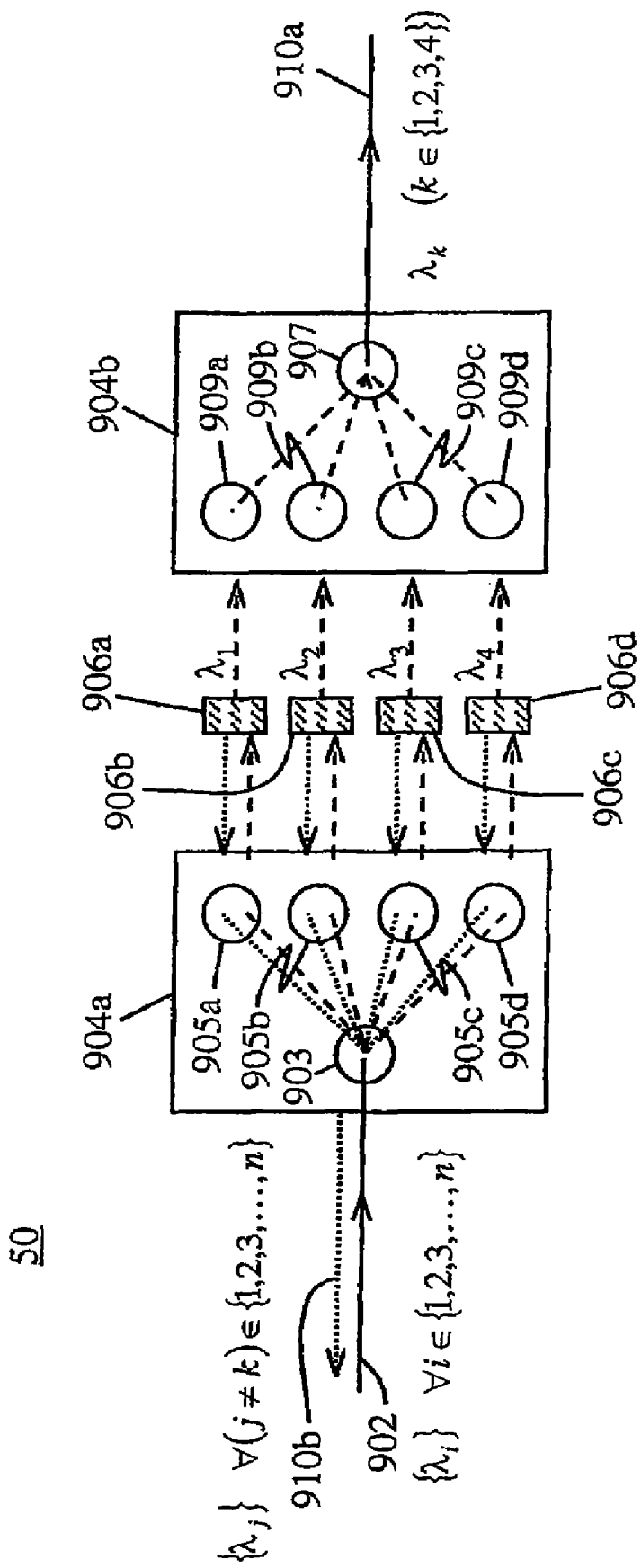
FIG. 12A is a diagram showing, in schematic fashion, a fourth tunable filter in accordance with the present invention, the fourth tunable filter further operating as a re-configurable channel dropping de-multiplexer.

FIG. 12A schematically illustrates a fourth tunable filter in accordance with the present invention, the fourth tunable filter further operating as a re-configurable channel dropping de-multiplexer. The re-configurable channel dropping de-multiplexer 50 shown in FIG. 12A comprises all the elements already illustrated in and discussed with reference to FIG. 11A except that a first optical output 910a is optically coupled to the second optical switch 904b and a further second optical output 910b is optically coupled to the first optical switch 904a. The re-configurable channel dropping de-multiplexer 50 (FIG. 12A) comprises the same previously described property of passing only one particular channel, depending upon the switch states of the optical switches 904a-904b, through to the first optical output 910a. Additionally, each one of the channel band pass filters 906a-906d reflects all channels not transmitted through the filter back to the first optical switch 904a. The reflected channels then return through the optical switch 904a back to the switch input 903 and then to the second output 910b. These reflected channels comprise all the original channels that were originally received from the optical input except for the particular channel that is passed through to the first optical output 910a. The particular angular alignments of the channel band pass filters 906a-906d may cause these reflected channels to return to the second output 910b instead of back to the optical input 902. Optionally, to simplify optical alignment and assembly, one could replace the entire group of band pass filters 906a-906d by a single conventional graded optical filter (not shown in FIG. 12A) wherein the central wavelength of the pass band transmitted through the filter varies along the length of the filter.

Figure 12B:
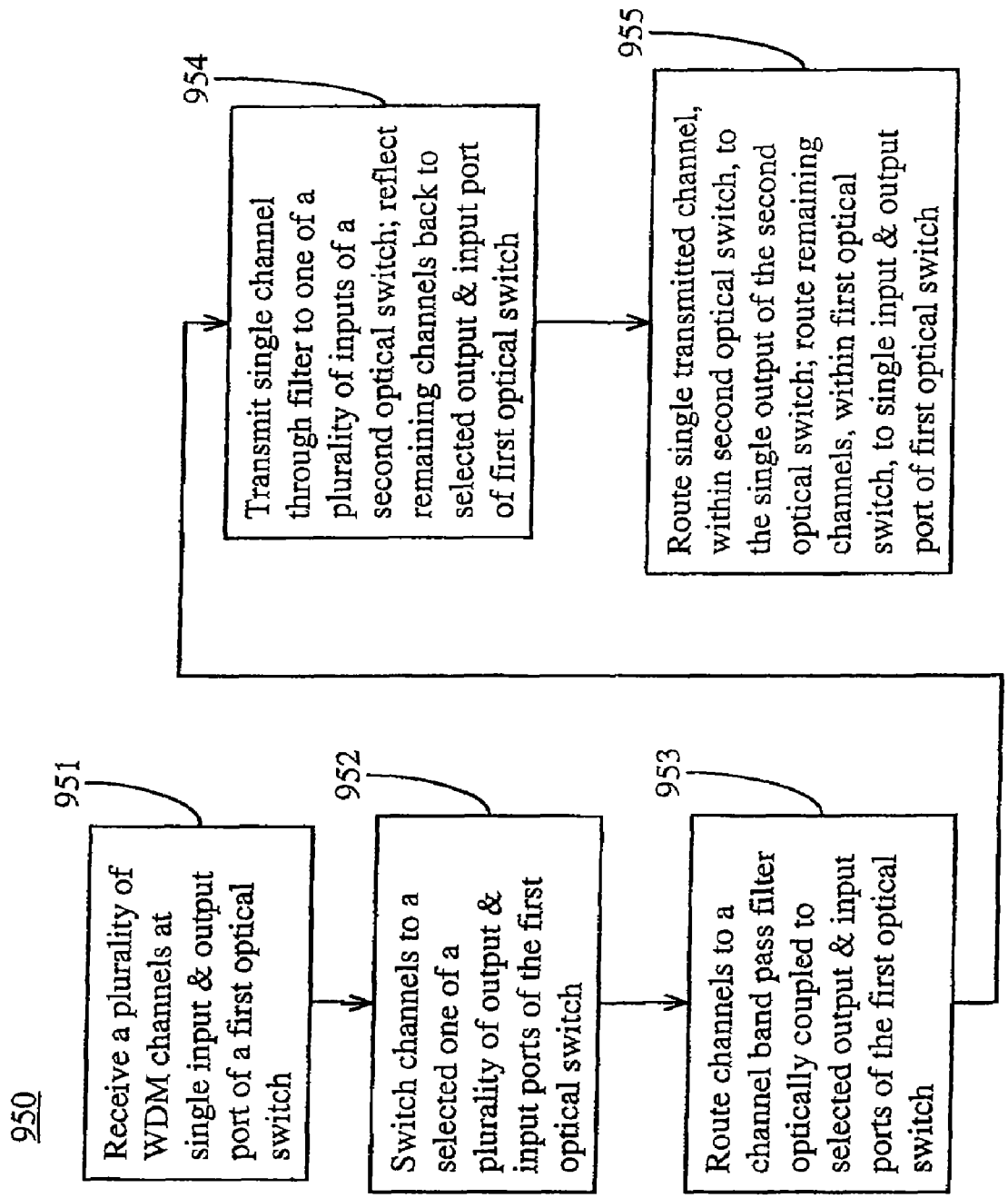
FIG. 12B is a flow chart of a fourth method of operation of a tunable filter in accordance with the present invention, the tunable filter further operating as a re-configurable channel dropping de-multiplexer.

FIG. 12B is a flow chart of a fourth method of operation of tunable filter in accordance with the present invention, the tunable filter further operating as a re-configurable channel dropping de-multiplexer. The method 950 illustrated in FIG. 12B comprises a first step 951 that comprises receiving a plurality of WDM channels at the single input and output port of a first optical switch. The method 950 then proceeds to the step 952 in which all of the channels are switched to a selected one of a plurality of output and input ports of the first optical switch. The method 950 then proceeds to the step 953 in which all of the channels are routed from the selected switch output and input port to a channel band pass filter optically coupled to the selected port of the first optical switch. The method 950 then proceeds to the step 954 in which only a single selected channel is transmitted through the filter to one of a plurality of inputs of a second optical switch optically coupled to the filter and in which the remaining express channels are reflected back to the selected output and input port of the first optical switch. Finally, the method 950 then proceeds to the step 955 in which the selected channel is routed, within the second optical switch, to the single output of the second optical switch and in which the remaining channels are routed, within the first optical switch, to the single input and output port of the first optical switch.

Figure 13A:
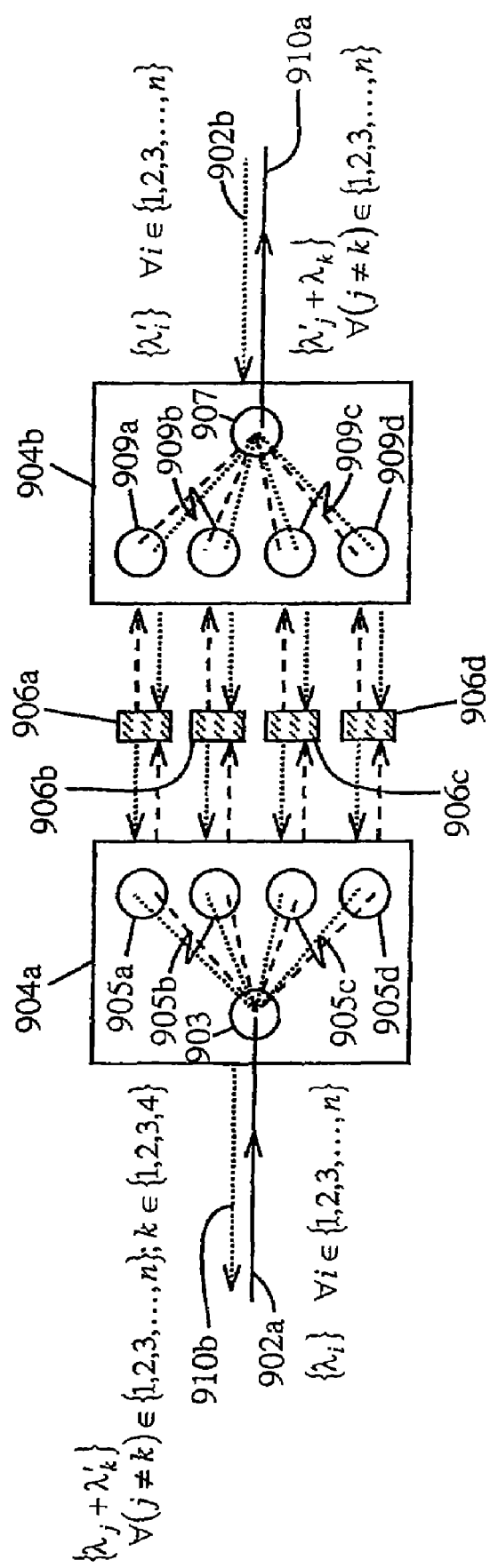
FIG. 13A is a diagram showing, in schematic fashion, a fifth tunable filter in accordance with the present invention, the tunable filter further operating as a re-configurable adding and dropping de-multiplexer.

FIG. 13A schematically illustrates a fifth tunable filter in accordance with the present invention, the tunable filter further operating as a re-configurable adding and dropping de-multiplexer. The re-configurable channel dropping de-multiplexer 60 shown in FIG. 13A comprises all the elements already illustrated in and discussed with reference to FIG. 12A except that a first optical input 902a is optically coupled to the first optical switch 904a and a further second optical input 902b is optically coupled to the second optical switch 904b. The re-configurable channel dropping de-multiplexer 60 (FIG. 13A) comprises the same previously described property of passing only one switch-selected channel, originally received from the first optical input 902a, through the apparatus to the first optical output 910a and of directing all other channels to the second optical output 910b. Additionally, the re-configurable channel dropping de-multiplexer 60 comprises the properties of receiving a second composite optical signal from the second optical input 902b, transmitting a replacement channel originally from the second composite optical signal to the second optical output 910b and reflecting all the remaining channels originally from the second composite optical signal to the first optical output 910a. Optionally, to simplify optical alignment and assembly, one could replace the entire group of band pass filters 906a-906d by a single conventional graded optical filter (not shown in FIG. 13A) wherein the central wavelength of the pass band transmitted through the filter varies along the length of the filter.

Figure 13B:
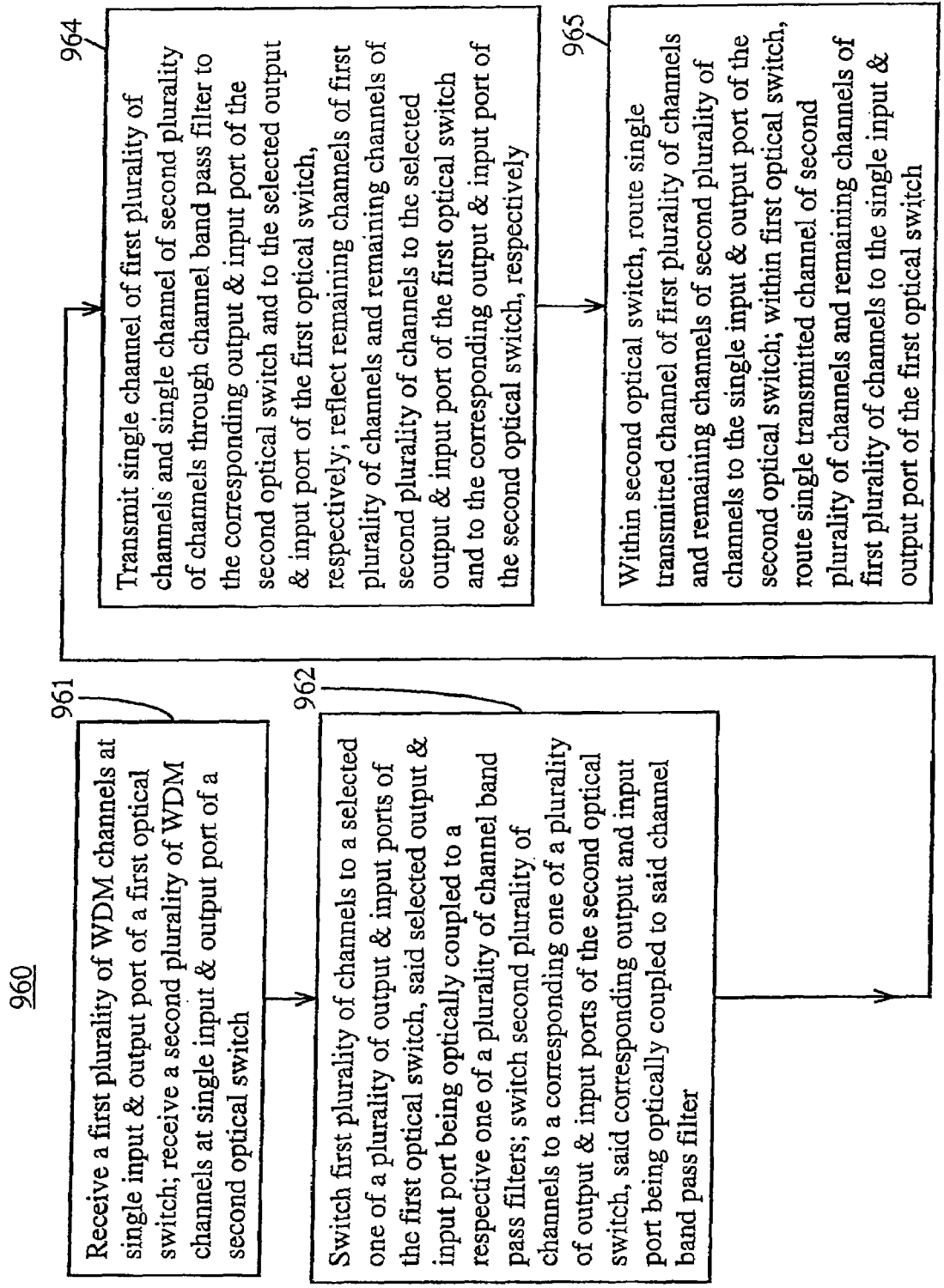
FIG. 13B is a flow chart of a fifth method of operation of a re-configurable channel dropping de-multiplexer in accordance with the present invention.

FIG. 13B is a flow chart of a fifth method 960 of operation of a tunable filter in accordance with the present invention, the tunable filter further operating as a re-configurable channel dropping de-multiplexer. The method 960 illustrated in FIG. 13B comprises a first step 961 that, comprises receiving a first plurality of WDM channels at the single input and output port of a first optical switch and also receiving a second plurality of WDM channels at the single input and output port of a second optical switch. The method 960 then proceeds to the step 962 in which the first plurality of channels is switched to a selected one of a plurality of output and input ports of the first optical switch, the selected output and input port being optically coupled to a respective one of a plurality of channel band pass filters and also in which the second plurality of channels is switched to a corresponding one of a plurality of output and input ports of the second optical switch, the corresponding output and input port being optically coupled to the same channel band pass filter. The first plurality of channels is routed from the first optical switch to a first side of the channel band pass filter and the second plurality of channels is routed from the second optical switch to an opposite side of the channel band pass filter.

From step 962 (FIG. 13B), the method 960 then proceeds to the step 964 in which a single channel of the first plurality of channels and a single channel of the second plurality of channels are transmitted through the channel band pass filter to the corresponding output and input port of the second optical switch and to the selected output and input port of the first optical switch, respectively. Further, in step 964, the remaining, or express, channels of the first plurality of channels and the remaining, or express channels of the second plurality of channels are reflected, respectively, back to the selected output and input port of the first optical switch and back to the corresponding output and input port of the second optical switch. Finally, the method 960 then proceeds to the step 965 in which the single transmitted channel of the first plurality of channels and the remaining channels of the second plurality of channels are routed, within the second optical switch, to the single input and output port of the second optical switch and, also, in which the single transmitted channel of the second plurality of channels and the remaining channels of the first plurality of channels are routed, within the first optical switch, to the single input and output port of the first optical switch.

The discussion is now directed to FIGS. 1-5 which illustrate specific preferred embodiments of tunable filters in accordance with the present invention, whose operation is shown schematically in FIGS. 9A, 10A, 11A, 12A and 13A. FIG. 1A illustrates a first preferred embodiment of a tunable optical filter in accordance with the present invention. The tunable filter 100 illustrated in FIG. 1A comprises a polarizing input port 116a, a first single-walk-off birefringent walk-off plate 102a, a first double-walk-off birefringent walk-off plate 108a, a second double-walk-off birefringent walk-off plate 108b, a second single-walk-off birefringent walk-off plate 102b and a polarizing output port 116b. The tunable filter 100 further comprises a first polarization modulator 106a optically coupled between the polarizing input port 116a and the first single-walk-off birefringent walk-off plate 102a, a second polarization modulator 106b optically coupled between the first single-walk-off birefringent walk-off plate 102a and the first double-walk-off birefringent walk-off plate 108a, a plurality of optical filters 120a-120c, and, optionally, filter 120d, each filter transmitting a different respective wavelength channel, optically coupled between the first 108a and second 108b double-walk-off birefringent walk-off plates, a third polarization modulator 106c optically coupled between the second double-walk-off birefringent walk-off plate 108b and the second single-walk-off birefringent walk-off plate 102b and a fourth polarization modulator 106d optically coupled between the second single-walk-off birefringent walk-off plate 102b and the polarizing output port 116b.

The polarization modulators 106a-106d comprising the tunable filter 100 (FIG. 1A) may be known liquid crystal or electro-optic modulators or any other equivalent apparatus that, under user control, either may or may not rotate the polarization orientation of linearly polarized light by 90 degrees upon application of a control signal by the user. Each single-walk-off birefringent walk-off plate deflects, offsets or shifts the position of light of a certain first linear polarization such that, upon emerging from the single-walk-off plate, the light of the first linear polarization is shifted or offset by at least one beam diameter relative to the position where it otherwise emerges if it is polarized orthogonal to the first linear polarization. Each double-walk-off birefringent walk-off plate deflects, offsets or shifts the position of light of a certain first linear polarization such that, upon emerging from the double-walk-off plate, the light of the first linear polarization is shifted or offset by at least two beam diameters relative to the position where it otherwise emerges if it is polarized orthogonal to the first linear polarization. The optic axes of the first 108a and second 108b double-walk-off birefringent walk-off plates are symmetrically disposed relative to one another such that polarized light of the first linear polarization passing generally from left-to-right is offset downward upon passing through the first double-walk-off birefringent walk-off plate 108a and is offset upward by a similar distance upon passing through the second double-walk-off birefringent walk-off plate 108b. The optic axes of the first 102a and second 102b single-walk-off birefringent walk-off plates are also symmetrically disposed relative to one another such that polarized light of the first linear polarization passing generally from left-to-right is offset upward upon passing through the first single-walk-off birefringent walk-off plate 102a and is offset downward by a similar distance upon passing through the second single-walk-off birefringent walk-off plate 102b.

Figure 6A:
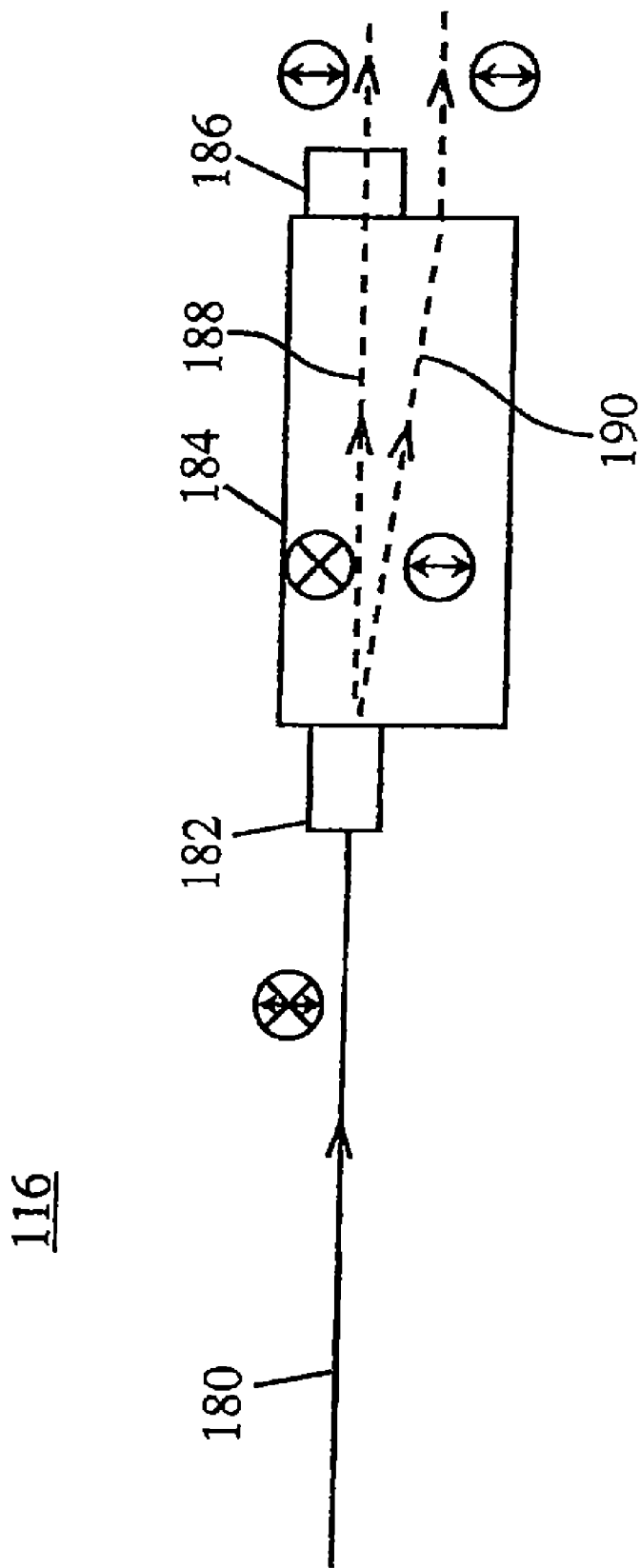
FIG. 6A is a detailed illustration of the structure of a polarizing optical port that may be utilized as either a polarizing input port or a polarizing output port within an embodiment of a tunable filter in accordance with the present invention.

Reference is now made to FIG. 6A, which is a detailed illustration of the structure of a polarizing optical port 116 that may be utilized as either the polarizing input port 116a or the polarizing output port 116b of FIG. 1A as well as other drawings herein. The port 116 is herein termed a "polarizing port" because the port outputs light comprising only a single linear polarization orientation and can only receive light comprising the same linear polarization orientation. The polarizing port 116 shown in FIG. 6A comprises an optical fiber 180, an optical collimator 182, a birefringent walk-off plate 184 and a reciprocal optical rotator 186. The optical collimator 182 is optically coupled to the optical fiber 180 and either receives input from or directs output to the fiber 180. When the optical fiber 180 is utilized to deliver input light, the collimator 182 receives diverging light rays and sets these rays parallel to one another so as to form a light beam. When the optical fiber 180 receives output light, the collimator 182 focuses a beam of collimated light into the end face of the fiber 180.

The birefringent walk-off plate 184 of the polarizing port 116 (FIG. 6A) is optically coupled to the collimator 182 at a side opposite to the fiber 180 and has the property of physically separating an unpolarized light beam received from collimator 182 into a deflected light beam 190 and an un-deflected light beam 188. The deflected light 190 comprises an e-ray having a first linear polarization orientation and the un-deflected light 188 comprises an o-ray having a second linear polarization orientation perpendicular to that of the e-ray.

Immediately after passing through the birefringent walk-off plate 184 of the polarizing port 116 (FIG. 6A), the two beams 188-190 emerge parallel to one another but have mutually orthogonal polarization orientations. The reciprocal optical rotator 186, which is optically coupled to the birefringent walk-off plate 184 at a side opposite to the collimator 182, is disposed so at to intercept the path of only one of the two beams 188-190. The reciprocal optical rotator 186 rotates the polarization orientation of the intercepted beam by 90° so as to be parallel to that of the other beam. In the reverse light propagation direction, that is, when the polarizing port 116 is utilized as an output port, the optical rotator 186 rotates the polarization orientation of only one of two beams so that the beams subsequently comprise mutually orthogonal polarization orientations and such that these two beams are subsequently combined upon passage through the birefringent walk-off plate 184. The reciprocal optical rotator 186 may be disposed so as to intercept either the o-ray 188 or the e-ray 190. When the polarizing port 116 is used as an output port, the ray paths are reversed from those shown in FIG. 6A.

Referring once again to FIG. 1A, it is noted that the tunable filter 100 is shown in both a Top View and a Side View. The Side View illustrates alternative pathways of optical channels through the tunable filter 100, the particular pathway being determined by the controlled settings of the polarization modulators 106a-106d. Although multiple alternative pathways are shown with dashed lines in FIG. 1A, it is to be noted that light only propagates along one such pathway at any time. It is also to be noted that, because of the light separation properties of the polarizing input port 116a (FIG. 6A), light propagating along anyone of the alternative pathways shown in the Side View of FIG. 1A and subsequent figures of this document actually comprises two separated beams. The two separated beams are not visible in the Side View because their drawn representations project one upon the other. However, the two separated beams may be observed in the Top View of FIG. 1A and subsequent figures of this document.

Also indicated in FIG. 1A, as well as in other figures of this document, are the polarization orientations of various signal light rays. These polarization orientations are indicated by double barbed arrows and/or crosses inscribed within circles. Unless otherwise indicated, double barbed arrows indicate light polarization along the indicated direction within the plane of the illustration, and crosses indicate light polarization normal to the plane of the page. Superimposed arrows and crosses either indicate non-polarized or randomly polarized light or beams having mutually perpendicular polarization plane orientations whose drawn representations project upon one another.

In operation of the tunable filter 100 (FIG. 1A), a light comprising a wavelength-division multiplexed optical signal comprising channels $\lambda_1$-$\lambda_n$ input from the polarizing input port 116a as two separated beams, having similar linear polarization orientation. Assume that the light emanating from the polarizing input port is linearly polarized with a polarization plane that is normal to the plane of the Side View drawing. The first polarization modulator 106a may be configured so as to either rotate this polarization plane by 90 degrees so that it subsequently becomes vertical-that is, oriented parallel to the left side of the Side View drawing-or, alternatively, so as to leave the polarization plane orientation unchanged and oriented perpendicular to the plane of the Side View drawing. Because of the birefringence of the first single-walk-off walk-off plate 102a, the pathway of the light through this birefringent plate 102a depends upon the polarization orientation of the light exiting the first polarization modulator. If the polarization is vertically oriented, the light propagates along the upper pathway (Side View) within birefringent plate 102a; if the polarization orientation is perpendicular to the plane of the Side-View drawing, the light follows the lower pathway (Side View) within birefringent plate 102a.

The light exiting the birefringent plate 102a of the tunable filter 100a is directed to the second polarization modulator 106b at one of two possible locations, location p1 or location p2, depending upon which path it followed through the birefringent plate 102a. The second polarization modulator 106b may be configured so as to either rotate the light polarization plane by 90 degrees or, alternatively, so as to leave the polarization plane orientation unchanged. The polarized light leaving the second polarization modulator 106b subsequently enters the first double-walk-off birefringent walk-off plate 108a.

Because of the birefringence of the first double-walk-off walk-off plate 108a, the propagation direction of the light through this birefringent plate 108a depends upon the polarization orientation of the light exiting the second polarization modulator 106b. Light whose polarization plane orientation is perpendicular to the plane of the Side View drawing propagates through the first double-walk-off birefringent walk-off plate 108a along a pathway that is parallel to the base of the page of the drawing ; light whose polarization plane orientation is vertical (in Side View) is offset downward, as viewed in FIG. 1A, during its passage through the first double-walk-off birefringent walk-off plate 108a.

Because light can exit the second polarization modulator at one of two alternative locations, p1 and p2, and because the second polarization modulator 106b can be in one of two alternative configurations, there are four possible light pathways through the first double-walk-off birefringent walk-off plate 108a. If the second polarization modulator 106b rotates the polarization plane orientation of light exiting from the upper location p1 of the polarization modulator 106b, as viewed in the Side View drawing of FIG. 1A, then the light's polarization plane becomes polarized perpendicular to the plane of the drawing and the light propagates along the uppermost pathway through the first double-walk-off birefringent walk-off plate 108a to the filter 120a. If, on the other hand, the second polarization modulator 106b does not rotate the polarization plane orientation of light exiting from the upper location pi, the polarization plane orientation remains vertical (in Side View) and the light propagates diagonally-that is, walks off-through the first double-walk-off birefringent walk-off plate 108a so as to be directed to the filter 120c.

If the second polarization modulator 106b rotates the polarization plane orientation of light exiting from the lower location p2 of the polarization modulator 106b, as viewed in the Side View of FIG. 1A, then the light's polarization plane becomes oriented vertically (in Side View) and the light propagates diagonally through the first double-walk-off birefringent walk-off plate 108a so as to be directed to the filter 120d, if present. If, on the other hand, the second polarization modulator 106b does not rotate the polarization plane orientation of light exiting from the lower location p2, the light's polarization plane remains oriented perpendicular to the plane of the Side View drawing and the light propagates parallel to the base of the page through the first double-walk-off birefringent walk-off plate 108a so as to be directed to the filter 120b.

Each of the filters 120a-120c and 120d, if present, transmits a different respective optical channel through to the second double-walk-off birefringent walk-off plate 108b. For instance, in the example shown in FIG. 1A, the filter 120a only transmits the channel ), the filter 120b only transmits the channel $\lambda_2$ and the filter 120c only transmits the channel $\lambda_3$. If there is no filter to intercept the light exiting from the first double-walk-off birefringent walk-off plate 108a, as, for instance, is the case for the light traversing the lowermost pathway of the Side View of FIG. 1A when filter 120d is not present, then all channels are passed through to the second double-walk-off birefringent walk-off plate 108b; otherwise, only the channel that is transmitted by a respective filter is delivered to the second double-walk-off birefringent walk-off plate 108b. As can be seen from FIG. 1A, the set of components disposed in the optical pathways subsequent to the filters-that is, on the right-hand side of FIG. 1A is the mirror image of the set of components disposed prior to the filters.

Thus, the second double-walk-off birefringent walk-off plate 108b, the third polarization modulator 106c, the second single-walk-off birefringent walk-off plate and the fourth polarization modulator 106d operate in reverse to the previously described routing operations so as to route light propagating along a pathway from anyone of the filters 120a-120c, or from the location not containing a filter (e.g., the nominal location of filter 120d), to the output polarizing port 116b. If the light is routed through one of the filters 120a-120c, the wavelength of the light channel $\lambda_d$ delivered to the output polarizing port 116b is determined by the pass band of that particular filter through which the light passes; if the light does not pass through one of the filters, then all wavelength channels $\lambda_1$-$\lambda_n$ are routed to the output polarizing port 116b.

Figure 1B:
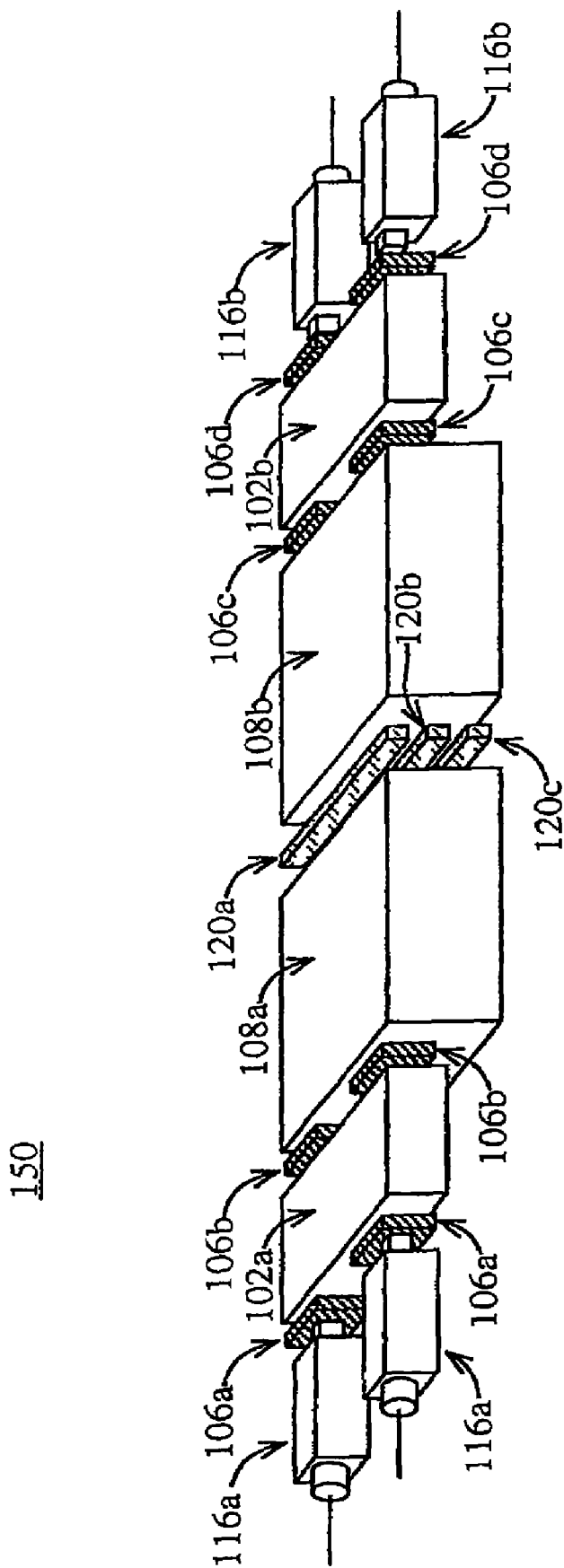
FIG. 1B is an illustration of a second preferred embodiment of a tunable filter in accordance with the present invention.

FIG. 1B illustrates a perspective view of a second preferred embodiment of a tunable filter in accordance with the present invention. The tunable filter 150 illustrated in FIG. 1B comprises the same polarizing input port 116a, first single-walk-off birefringent walk-off plate 102a, first double-walk-off birefringent walk-off plate 108a, plurality of optical filters 120a-120c, second double-walk-off birefringent walk-off plate 108b, second single-walk-off birefringent walk-off plate 102b and polarizing output port 116b already described in reference to FIG. 1A. Additionally, the tunable filter 150 comprises a second polarizing input port 116a and a second polarizing output port 116b. Still further, the tunable filter 150 comprises two first polarization modulators 106a each optically coupled between a respective one of the polarizing input ports 116a and the first single-walk-off birefringent walk-off plate 102a, two second polarization modulators 106b optically coupled between the first single-walk-off birefringent walk-off plate 102a and the first double-walk-off birefringent walk-off plate 108a, two third polarization modulators 106c optically coupled between the second double-walk-off birefringent walk-off plate 108b and the second single- walk-off birefringent walk-off plate 102b and two fourth polarization modulators 106d each optically coupled between the second single-walk-off birefringent walk-off plate 102b and a respective one of the polarizing output ports 116b.

As is evident from comparison of FIG. 1B with FIG. 1A, the tunable filter 150 comprises two sets of parallel optical pathways. A first set of optical pathways leads from the front-most polarizing input port 116a to the front-most polarizing output port 116b. This first set of pathways passes through the front-most polarization modulators 106a-106d in FIG. 2B. A second set of optical pathways, parallel to but independent of the first set of pathways, leads from the rearward polarizing input port 116a to the rearward polarizing output port 116b and passes through the rearward polarization modulators 106a-106d shown in FIG. 2B. Thus, the tunable filter 150 (FIG. 1B) performs the functions of two side-by-side instances of the tunable filter 100 shown in FIG. 1A. However, the tunable filter 150 saves costs, relative to the tunable filter 100, because only a single instance is used of each of the first 102a and second 102b single-walk-off birefringent walk-off plates and each of the first 108a and second 108b double-walk-off birefringent walk-off plates. The tunable filter 150 may be further expanded, in the same fashion that the tunable filter 150 is modified from the tunable filter 100, so as to provide the functions of three, four, etc. side-by-side instances of the tunable filter 100.

Figure 2A:
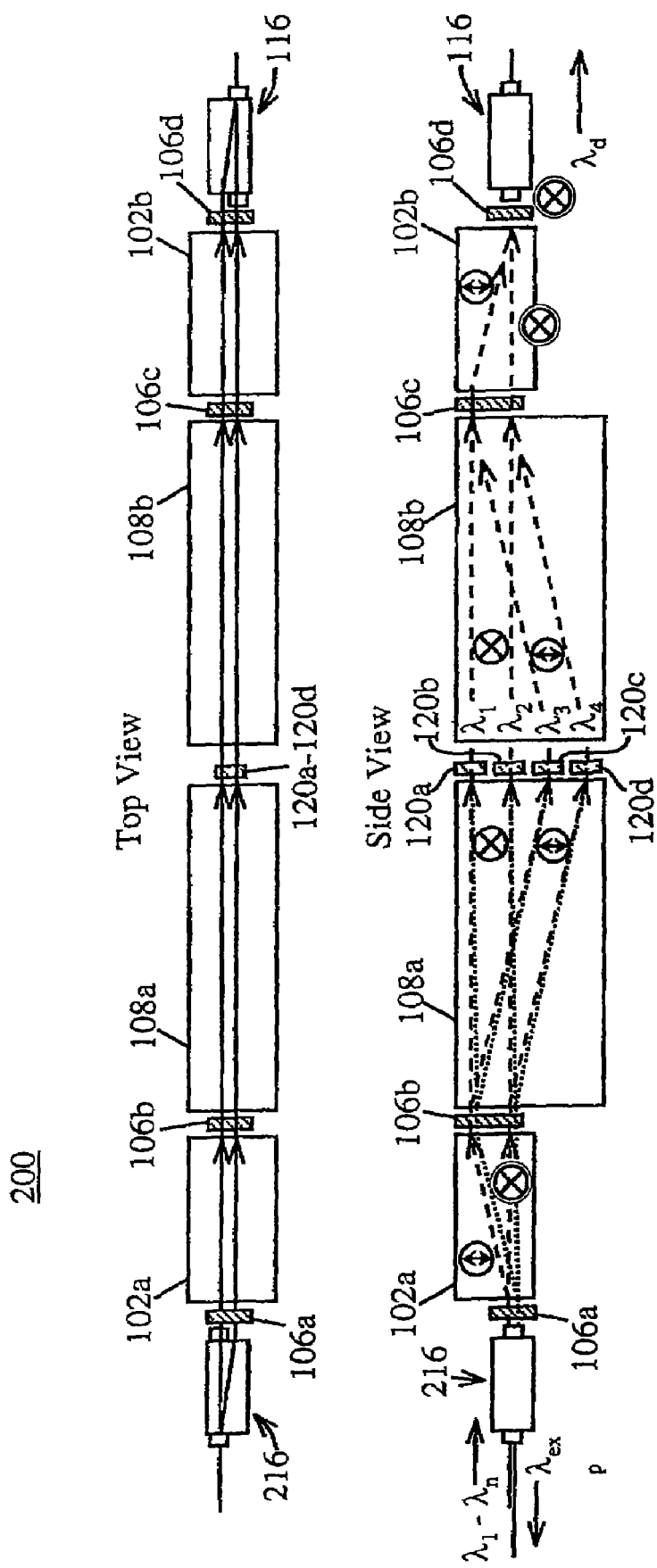
FIG. 2A is an illustration of a third preferred embodiment of a tunable filter in accordance with the present invention, the tunable filter further operating as re-configurable channel dropping de-multiplexer.

FIG. 2A illustrates a third preferred embodiment of a tunable filter in accordance with the present invention. The tunable filter 200 illustrated in FIG. 2A further operates as a reconfigurable channel dropping de-multiplexer and comprises all the same components already described in reference to FIG. 1A except that: (a) the optical filters 120a-120c and 120d, if present within the tunable filter 200 are tilted such that the normal line to the filters is disposed at a slight angle such to the incoming signal light and (b) the polarizing input port is replaced by a polarizing input and output port 216 (FIG. 2A).

Figure 6B:
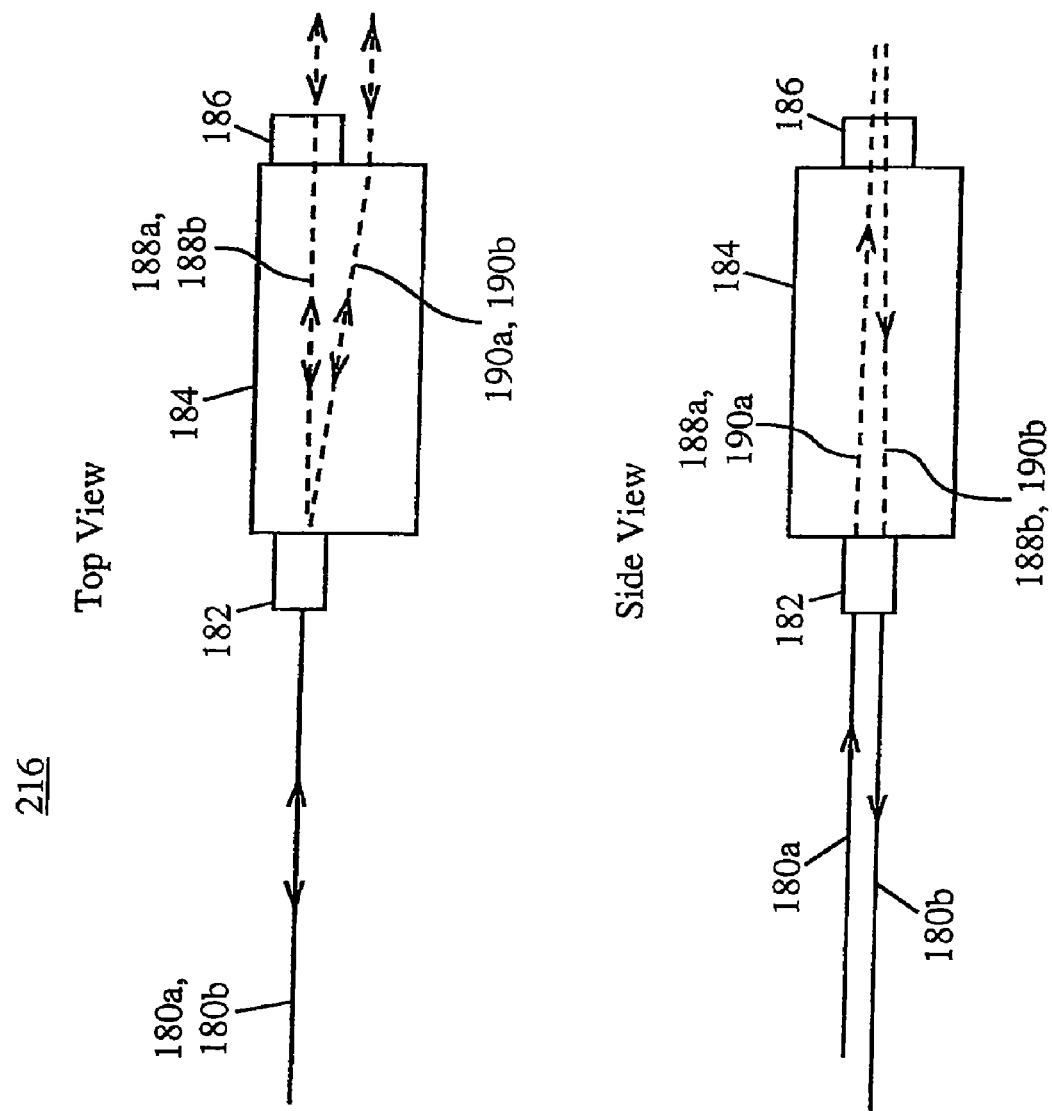
FIG. 6B is a detailed illustration of the structure of a polarizing optical port that may be utilized as polarizing input and output port within an embodiment of a tunable filter in accordance with the present invention.

The polarizing input and output port 216 is shown in detail in FIG. 6B and is similar to the polarizing port 116 (FIG. 6A) except that a first fiber 180a, optically coupled to collimator 182, is used to deliver input light to the apparatus and a second fiber 180b, also optically coupled to collimator 182, is used to output light from the apparatus. The Top View shown in FIG. 6B is similar to the view of polarizing port 116 already shown in FIG. 6A. The light input from fiber 180a is separated into two beams 188a and 190a that exit the polarizing input and output port 216 as two parallel beams. The light returning to the polarizing input and output port 216 also comprises two parallel beams 188b and 190b. These latter beams are combined within the polarizing input and output port 216 into an output light that is delivered to the second fiber 180b. The Side View portion of FIG. 6B shows that the two separated beams 188a and 190a comprising the input light follow slightly different trajectories, both within and external to the polarizing input and output port 216, than are followed by the two separated output beams 188b and 190b.

Within the tunable filter 200 (FIG. 2A), the filters 120a-120d are tilted such that any signal light rays reflected by any filter propagate in a reverse direction into and through the first double-walk-off birefringent walk-off plate 108a along pathways (shown as dotted lines) that are at a slight angle to those of forward propagating signal light rays (shown as dashed lines). This slight angular mismatch between forward and reverse propagating rays causes the reflected rays to enter the second fiber 180b (FIG. 6B) of the polarizing input and output port 216. The first fiber 180a of the polarizing input and output port 216 is used to input light to the port 216 and to the tunable filter 200. The reflected rays comprise all channels except for the particular dropped channel $\lambda_d$ that passes through one of the optical filters 120a-120d. The choice of the dropped channel $\lambda_d$ depends upon which particular one of the filters receives the forward propagating rays. The remaining set of channels or wavelengths that return to port 216 are the "express" channels, denoted by the symbol $\lambda_{exp}$.

Figure 2B:
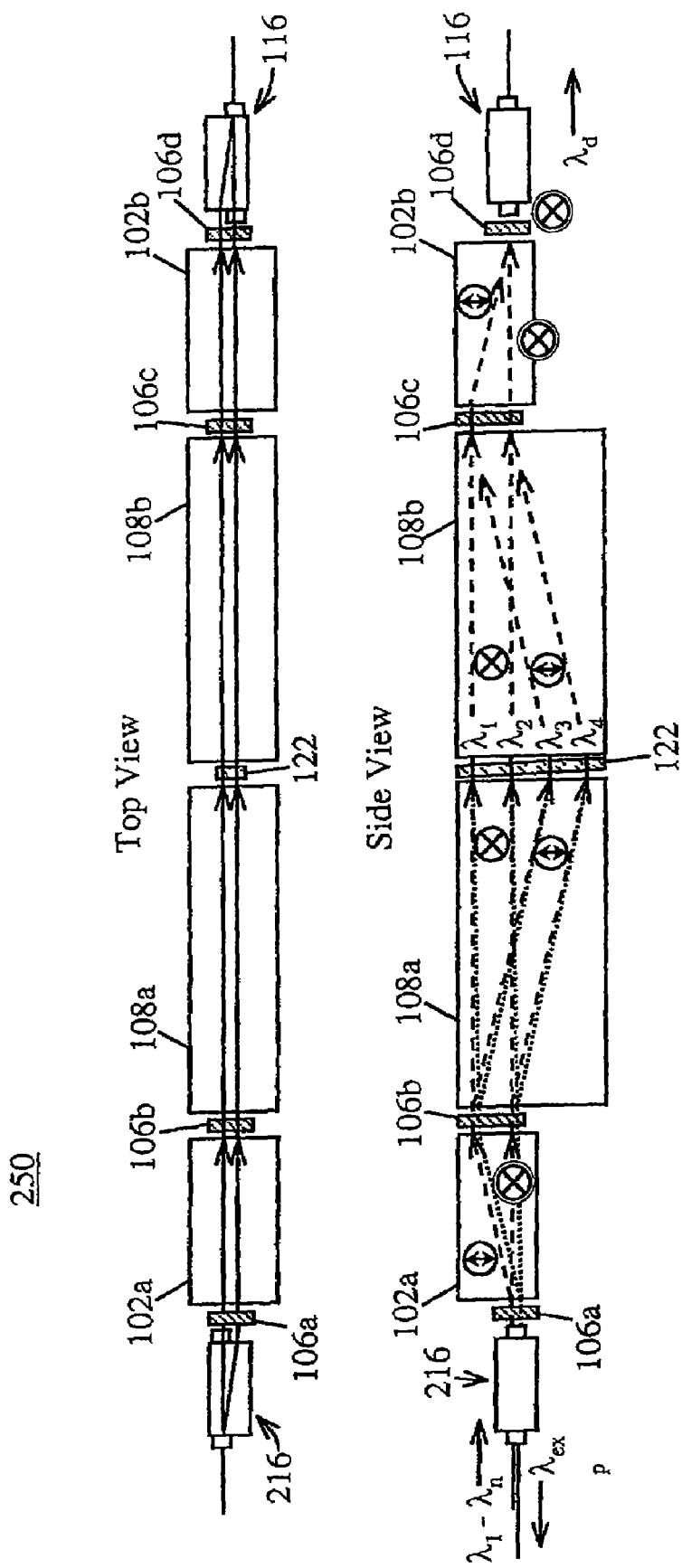
FIG. 2B is an illustration of a fourth preferred embodiment of a tunable filter in accordance with the present invention, the tunable filter further operating as re-configurable channel dropping de-multiplexer.

FIG. 2B illustrates a fourth preferred embodiment of a tunable filter in accordance with the present invention. The tunable filter 250 illustrated in FIG. 2B comprises all the same components already described in reference to FIG. 2A except that the previously described plurality of optical filters are replaced by a single graded optical filter 122. The wavelength of the channel that is transmitted through the graded optical filter 122, which is known in the art, varies continuously along the length of the filter-that is, from top to bottom as shown in FIG. 2B. Thus, the wavelengths $\lambda_1$, $\lambda_2$, $\lambda_3$ and $\lambda_4$ are transmitted through the filter 122 at the positions indicated in FIG. 2B. As in the previously described tunable filter 200 (FIG. 2A), the angular relationship between the filter 122 and the forward propagating signal rays is such that the reflected rays-comprising all channels except for the particular dropped channel-propagate in the reverse direction back to the second fiber 180b (FIG. 6B) of the polarizing input and output port 11 6c. The use of the single graded filter 122 within the tunable filter 250 eliminates the need to tilt several different filters all at the same angle.

Figure 2C:
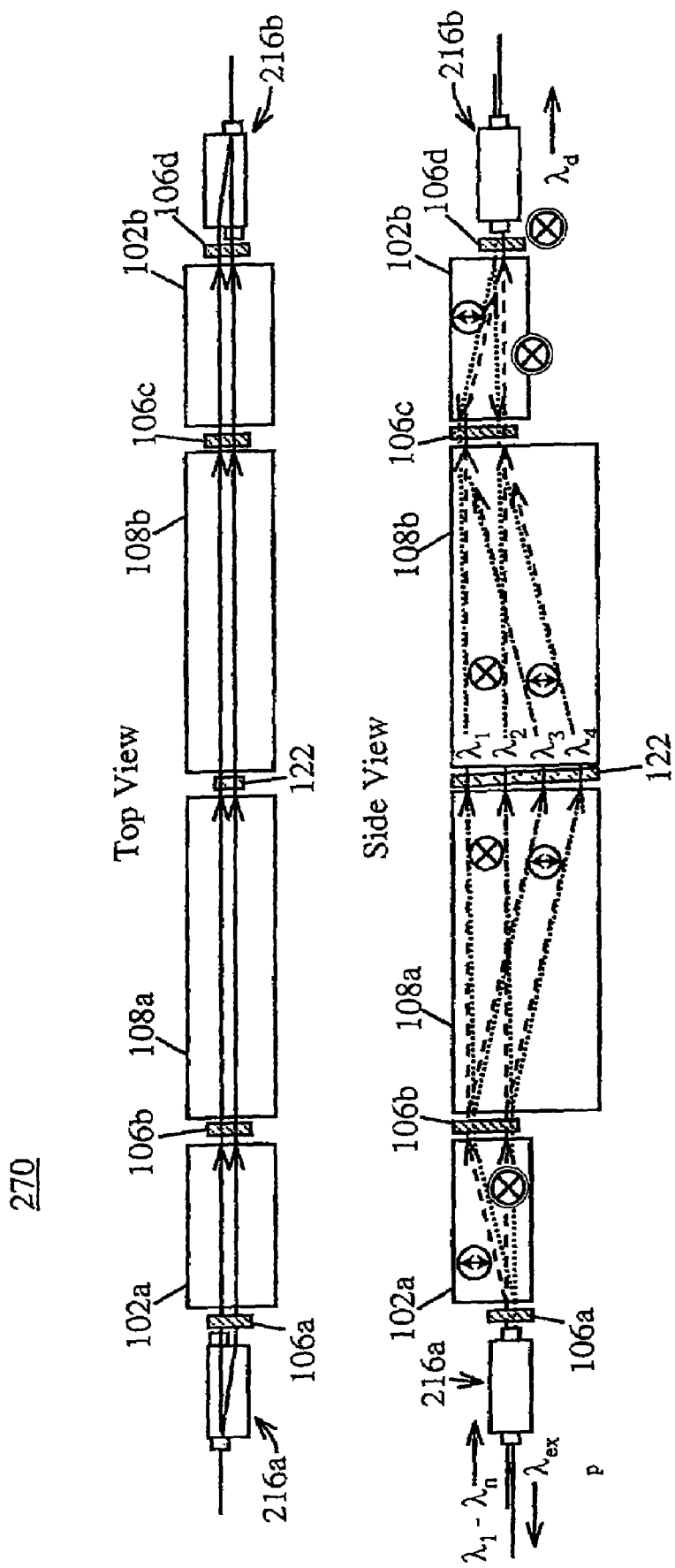
FIG. 2C is an illustration of a fifth preferred embodiment of a tunable filter in accordance with the present invention, the tunable filter further operating as re-configurable channel dropping de-multiplexer.

FIG. 2C illustrates a fifth preferred embodiment of a tunable filter in accordance with the present invention, the tunable filter further operating as re-configurable channel dropping de-multiplexer. The tunable filter 270 illustrated in FIG. 2C comprises all the same components already described in reference to FIG. 2B except that the polarizing output port is replaced by a second polarizing input and output port 216b (FIG. 2C). The two portions of the tunable filter 270 to the left side and to the right side of the graded filter 122 are mirror images of one another. Therefore, the tunable filter 270 functions as a tunable add-drop filter as schematically illustrated in FIG. 13A.

Figure 3A:
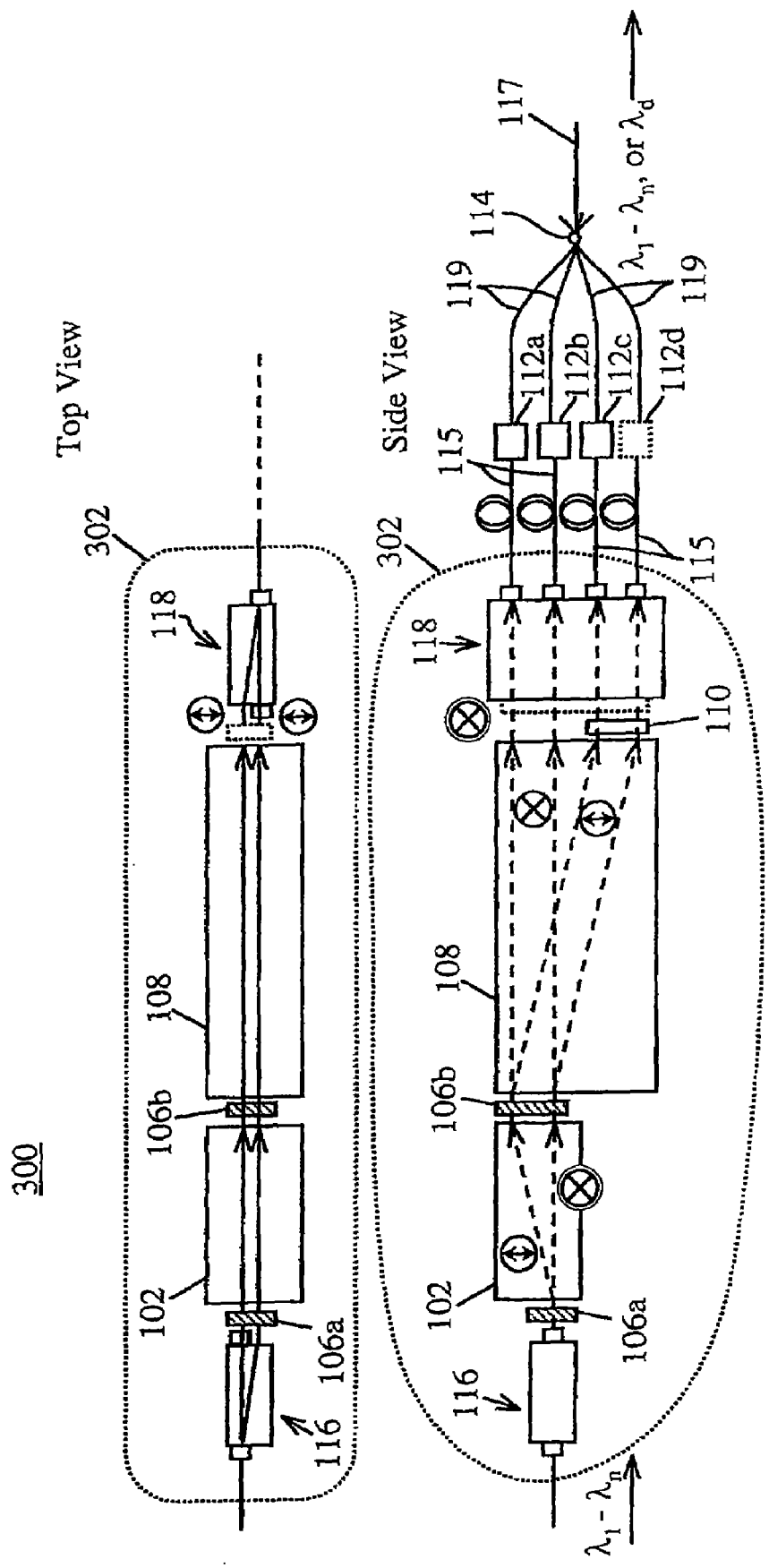
FIG. 3A is an illustration of a sixth preferred embodiment of a tunable filter in accordance with the present invention.

FIG. 3A illustrates a sixth preferred embodiment of a tunable filter in accordance with the present invention. The tunable filter 300 illustrated in FIG. 3A comprises a polarizing input port 116, a single-walk-off birefringent walk-off plate 102, a double-walk-off birefringent walk-off plate 108, and a multiple-output polarizing port 118. The tunable filter 300 further comprises a first polarization modulator 106a optically coupled between the polarizing input port 116 and the single-walk-off birefringent walk-off plate 102, a second polarization modulator 106b optically coupled between the single-walk-off birefringent walk-off plate 102 and the double-walk-off birefringent walk-off plate 108 and a half-wave plate 110 partially optically coupled between the double-walk -off birefringent walk-off plate 108 and the multiple-output polarizing output port 118. The aforementioned set of components of the tunable filter 300 comprises an optical switch 302 as illustrated in FIG. 3A. In addition to the switch 302, the tunable filter 300 further comprises a plurality of optical fibers 115 optically coupled to the multiple-output polarizing port 118, a plurality of optical band pass filter assemblies 112a-112c optically coupled to the optical fibers, each optical band pass filter assembly transmitting a different respective wavelength channel to a receiving fiber 119, a star coupler 114 and an output optical fiber 117. A receiving fiber 119 and the star coupler 114 serve to route a particular dropped channel $\lambda_d$, selected by the configuration of the switch 302, from one of the optical fibers 115 to the output optical fiber 117.

Figure 6C:
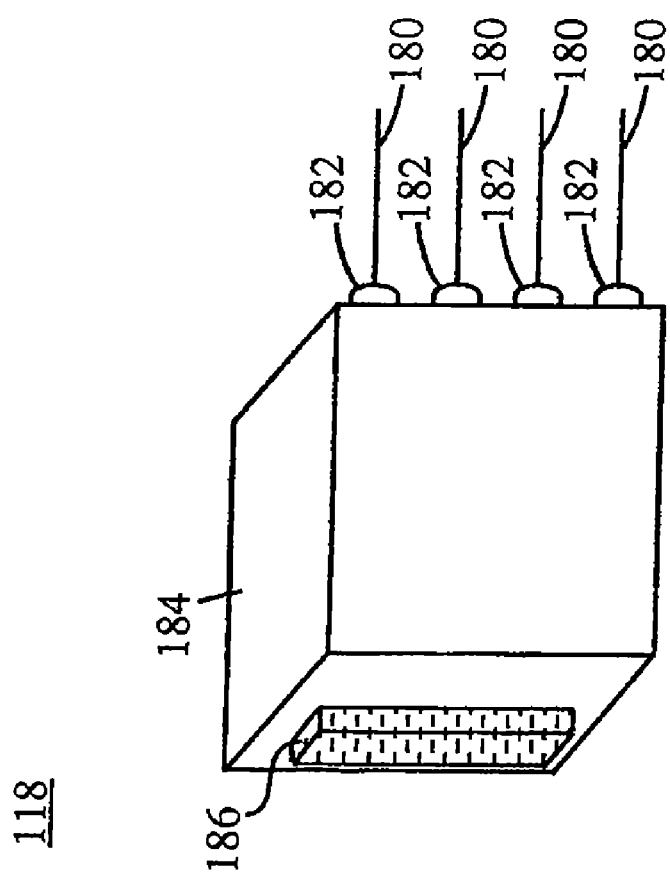
FIG. 6C is a detailed illustration of the structure of a multiple-output polarizing optical port that may be utilized within an embodiment of a tunable filter in accordance with the present invention.

Reference is now made to FIG. 6C to describe the structure of the multiple-output polarizing output port 118 utilized within the tunable filter 300. The multiple output polarizing port 118 operates as if it were several stacked instances of the polarizing port 116 and comprises the same birefringent walk-off plate 184 and reciprocal optical rotator 186 already described in reference to FIG. 6A. However, instead of utilizing just a single collimator and a single optical fiber, the multiple-output polarizing port 118 utilizes a plurality of collimators 182 optically coupled to the same walk-off plate 184. The single walk-off plate 184 and reciprocal optical rotator 186 are used in conjunction with optical signals emanating from or delivered to each of the collimators. Each such optical signal is independent of the other optical signals and utilizes a different respective portion of the birefringent walk-off plate 184 and reciprocal optical rotator 186.

Figure 7A:
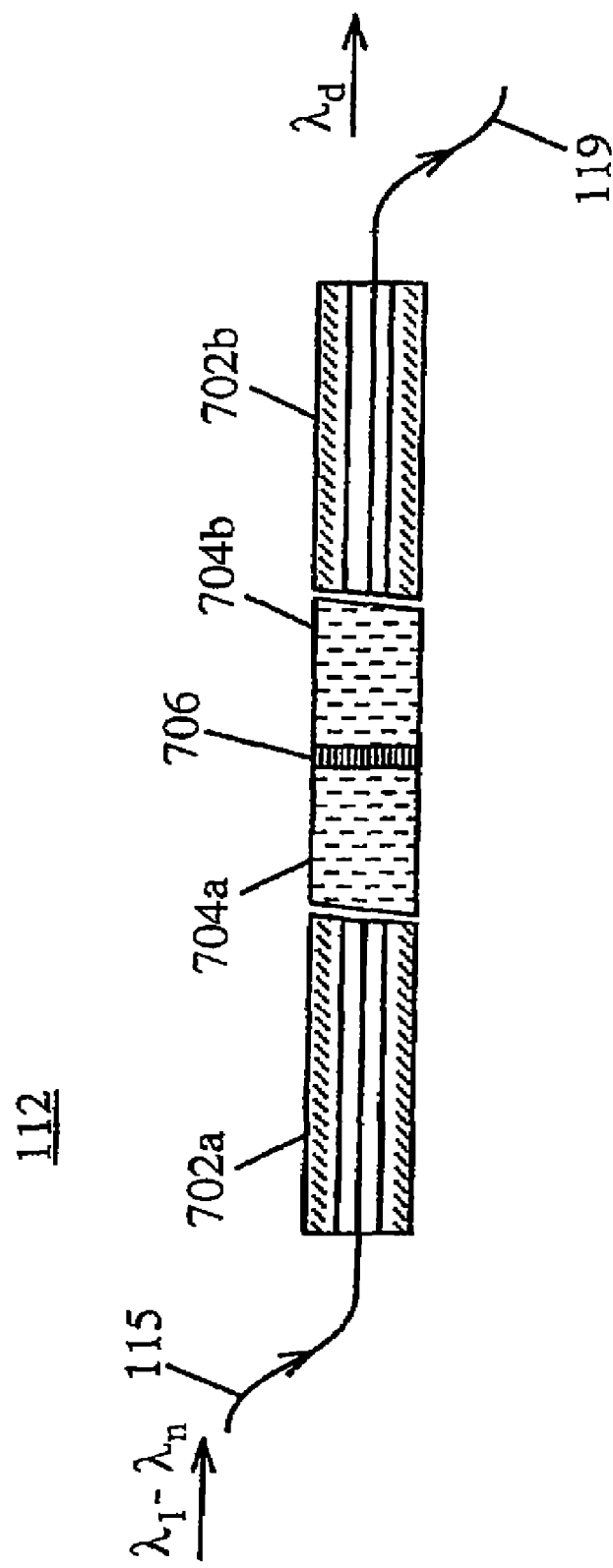
FIG. 7A is an illustration of a known optical band pass filter assembly that may be utilized within an embodiment of a tunable filter in accordance with the present invention.

Reference is now made to FIG. 7A to describe one possible structure of an optical band pass filter assembly. Each of the optical band pass filter assemblies 112a-112c shown in FIG. 3A and in other drawings herein may comprise the structure of the known optical band pass filter assembly 112 shown in FIG. 7A. The band pass filter assembly comprises a first fiber holder 702a, a first lens 704a, a band pass filter 706 optically coupled to the first lens, a second lens 704b optically coupled to the band pass filter at a side opposite to the first lens, and a second fiber holder 702b. Each of the first and second fiber holders 702a-702b may be capillary tubes. Each of the first and second lenses 702a-702b may be a well-known GRIN lens. A first optical fiber 115, utilized for input, is disposed within the first fiber holder 702a and is optically coupled to the first lens 704a. A second optical fiber 119, utilized for output, is disposed within the second fiber holder 702b and is optically coupled to the second lens 704b. The filter 706 is, preferably, a thin-film filter. In the known band pass filter assembly 112, the first fiber holder 702a holds the first optical fiber 115 in place, relative to the first lens 704a, such that the light from a wavelength-division multiplexed signal, comprising the channels $\lambda_1$-$\lambda_n$ emanating from the fiber 115 is delivered to the filter 706 as a collimated light. The filter 706 allows transmission of only one particular channel, $\lambda_d$, from among the original channels through to the second lens 704b. The second fiber holder 702b holds the second optical fiber 119 in place, relative to the second lens 704b, such that the collimated light of the channel $\lambda_d$ is focused into the end face of the second fiber 119.

Figure 3B:
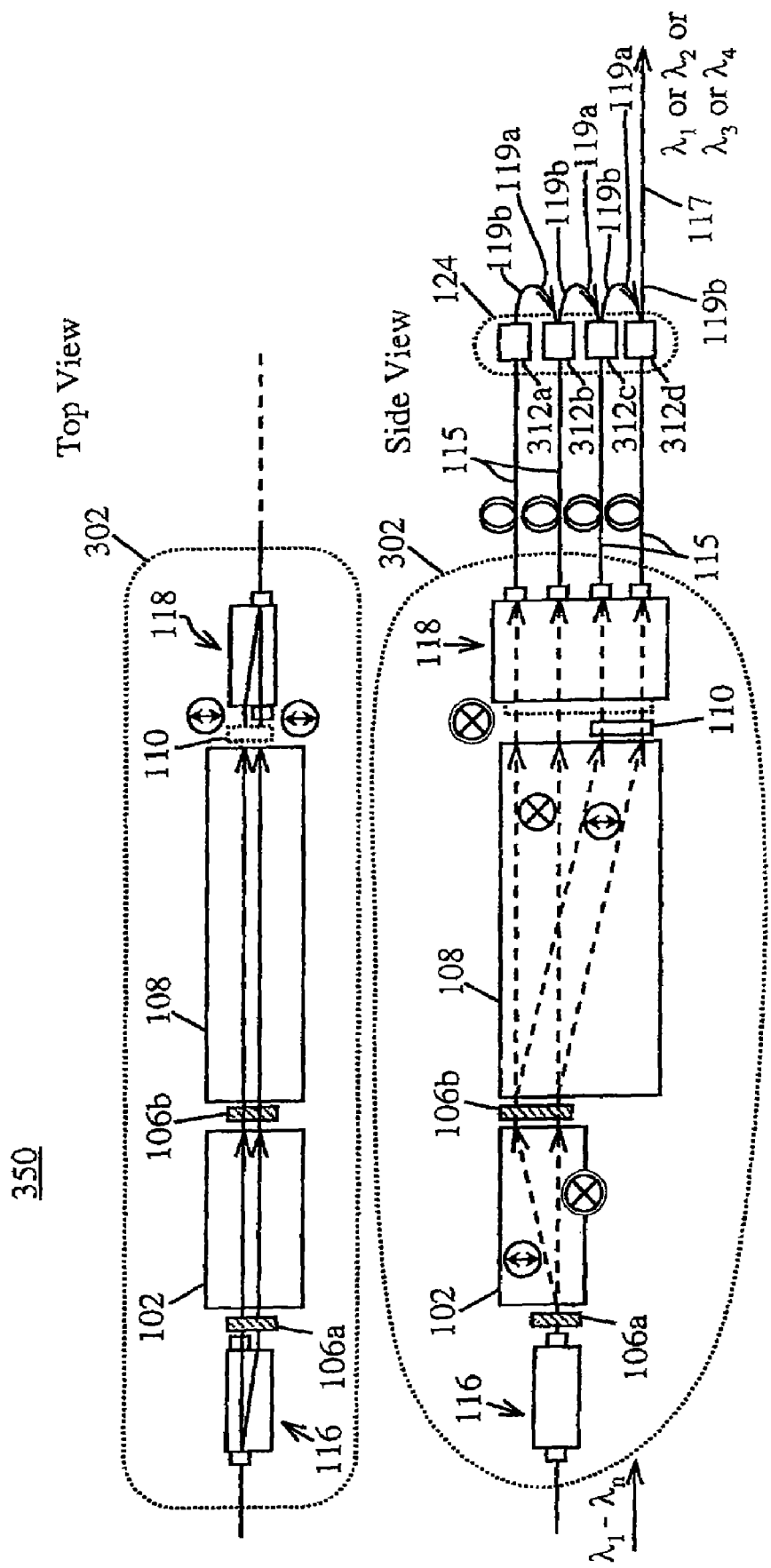
FIG. 3B is an illustration of a seventh preferred embodiment of a tunable filter in accordance with the present invention.

FIG. 3B illustrates a seventh preferred embodiment of a tunable filter in accordance with the present invention. The tunable filter 350 illustrated in FIG. 3B comprises the same components as previously described with reference to FIG. 3A, except that the star coupler is eliminated. Instead of incorporating a star coupler to route a particular channel from one of the optical fibers 115 to the output optical fiber 117, as in the tunable filter 300, the tunable filter 350 (FIG. 3B) comprises a multiplexer 124.

The multiplexer 124, shown in FIG. 3B, may, preferably, be formed from a serial cascade arrangement of the plurality of optical band pass filter assemblies 312a, 312b, etc., each such optical band pass filter assembly transmitting only a single respective channel. Within such a serial cascade arrangement, each optical fiber 115 within the tunable filter 350 (FIG. 3B) is optically coupled to a respective one of the optical band pass filter assemblies 312a-312d comprising the multiplexer 124. An output fiber 119b of each such optical band pass filter 312a-312d is optically coupled to either an input fiber 119a of a subsequent optical band pass filter assembly of the serial cascade arrangement or, if the assembly is the last one in the serial cascade arrangement, to the output fiber 117. Each optical band pass filter assembly 312a-312d may be constricted as illustrated by the optical band pass filter assembly 312 in FIG. 7B.

Figure 7B:
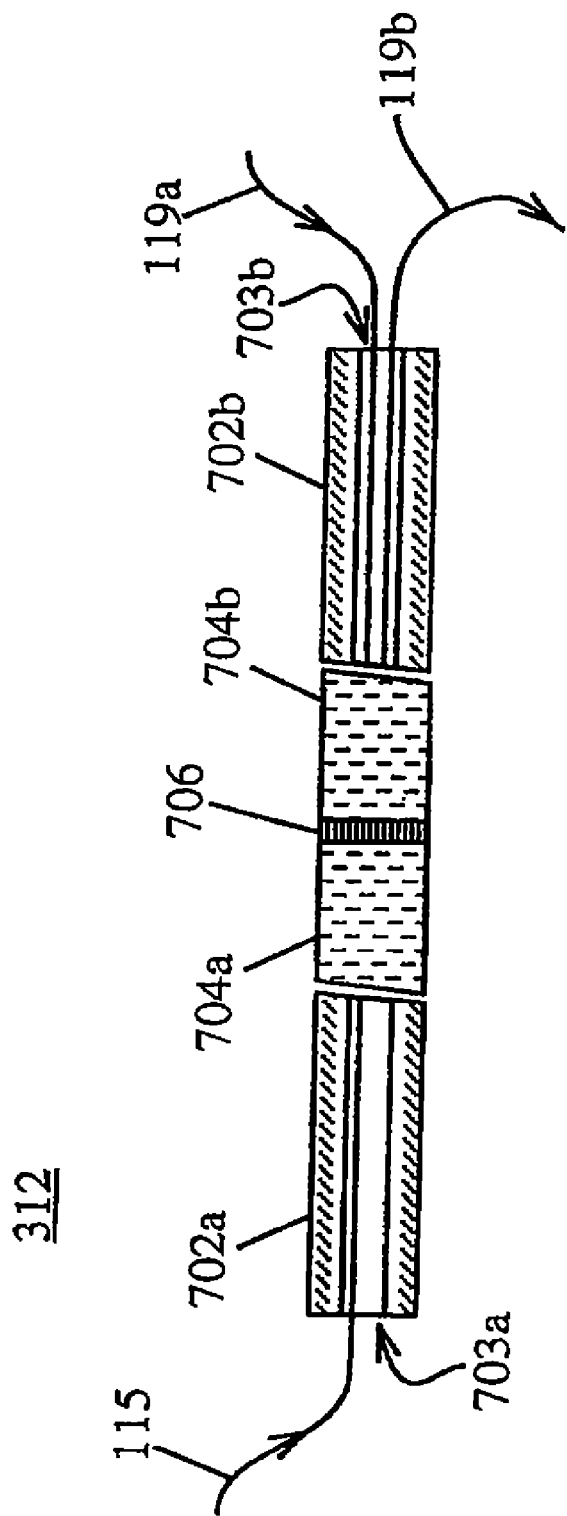
FIG. 7B is an illustration of a known three-port optical filter assembly that may be utilized within an embodiment of a re-configurable channel dropping de-multiplexer in accordance with the present invention.

The channel filter assembly 312 shown in FIG. 7B comprises a first fiber holder 702a comprising a hollow bore 703a and a second fiber holder 702b comprises a hollow bore 703b. The hollow bore 703a of the first fiber holder 702a is of an appropriate diameter so as to house an optical fiber 115. The hollow bore 703b of the second fiber holder 702b is of an appropriate diameter so as to house at least an input fiber 119a and an output fiber 119b. The optical fiber 115 is optically coupled to a first collimating lens 704a whereas both the input fiber 119a and the output fiber 119b are optically coupled to a second collimating lens 704b. An optical filter 706, which, preferably, comprises a well-known thin-film filter, is optically coupled between the first collimating lens 704a and the second collimating lens 704b. The optical filter 706 (FIG. 7B) comprises a pass band width that is sufficiently narrow such that only one channel of a plurality of channels $\lambda_1$-$\lambda_n$ delivered from optical fiber 115 may be transmitted from the first collimating lens 704a through the filter 706 to the second collimating lens 704b and then to the output fiber 119b. Other channels comprising wavelengths that are not transmitted through the filter 706 are reflected at the filter 706. Therefore, any channels delivered through fiber 119a and comprising wavelengths not transmitted through filter 706 will, instead, be reflected by the filter 706 back through the second collimating lens 704b to the output fiber 119b.

Depending upon the configuration of the switch 302 comprising the tunable filter 350, a certain one of the optical fibers 115 will deliver all the optical channels $\lambda_1$-$\lambda_n$ to a respective one of the channel filter assemblies 312a-312d comprising the multiplexer 124 (FIG. 3B). Only one such fiber 115 carries all the channels at anyone time; the other fibers carry no channels. The output fiber 119b of each one of the first three channel band pass filter assemblies 312a-312c in the sequence of channel band pass filter assemblies is optically coupled to the input fiber 119a of the next channel band pass filter assembly in the sequence; the output of the final channel band pass filter assembly of the sequence is optically coupled to the output fiber 117 (FIG. 3B). Only one channel, $\lambda_d$, from among the channels $\lambda_1$-$\lambda_n$ will be transmitted through the channel band pass filter assembly to which it is delivered. If this band pass filter assembly happens to be the last channel band pass filter assembly 312d, then the transmitted channel is delivered directly to the output fiber 117. If the band pass filter assembly is one of the first three band pass filter assemblies 312a-312c, then the transmitted channel is delivered to the input fiber 119a of the next channel band pass filter assembly in the sequence of band pass filter assemblies. The transmitted channel will then be reflected from the filter 706 to the output fiber 119b of each subsequent channel band pass filter assembly in the sequence. Finally, the transmitted channel will be reflected at the final band pass filter assembly 312d to the output fiber 117.

Figure 4:
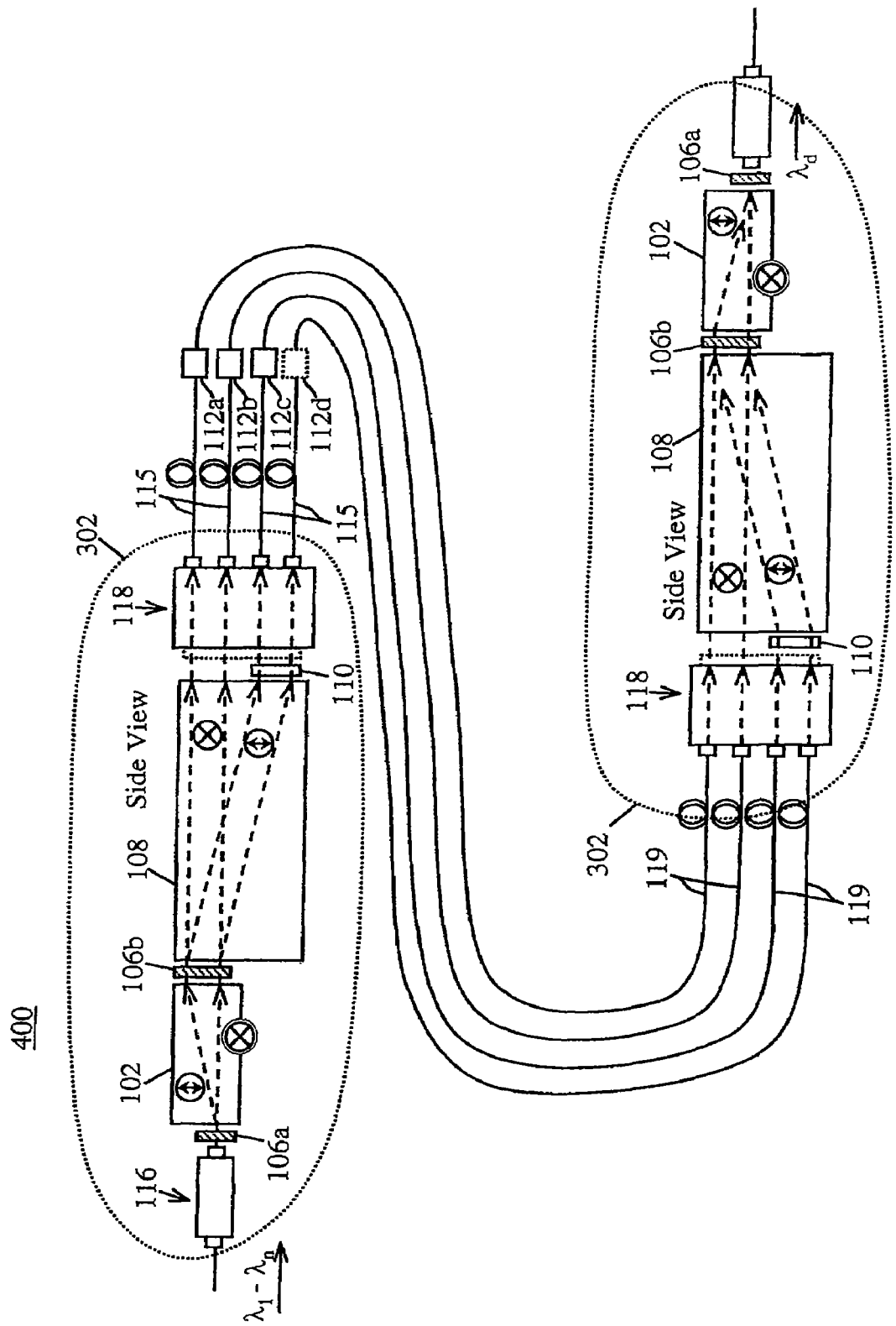
FIG. 4 is an illustration of an eighth preferred embodiment of a tunable filter in accordance with the present invention.

FIG. 4 illustrates an eighth preferred embodiment of a tunable filter in accordance with the present invention. The tunable filter 400 illustrated in FIG. 4 comprises a first switch 302 and a second switch 302, wherein each of the first and second switches 302 comprises the same set of components as shown as switch 302 in FIG. 3A. A plurality of optical fibers 115 and 119 are optically coupled between the first and second switches and a plurality of optical band pass filter assemblies 112a-112c are optically coupled between respective optical fibers 115 and 119, each optical band pass filter assembly transmitting a different respective wavelength channel. As can be seen from FIG. 4, the two switches 302 are disposed within the optical pathways of the tunable filter 400 as mirror images of one another. As previously described in reference to FIG. 3B, the first switch 302 directs all the optical channels $\lambda_1$-$\lambda_n$, to one of the optical fibers 115. The respective channel band pass filter assembly optically coupled to the fiber only permits a single selected channel, $\lambda_d$, to pass through to the second switch 302 via an optical fiber 119. The second switch is configured so that it routes the channel $\lambda_d$ to the output fiber 117.

Figure 5A:
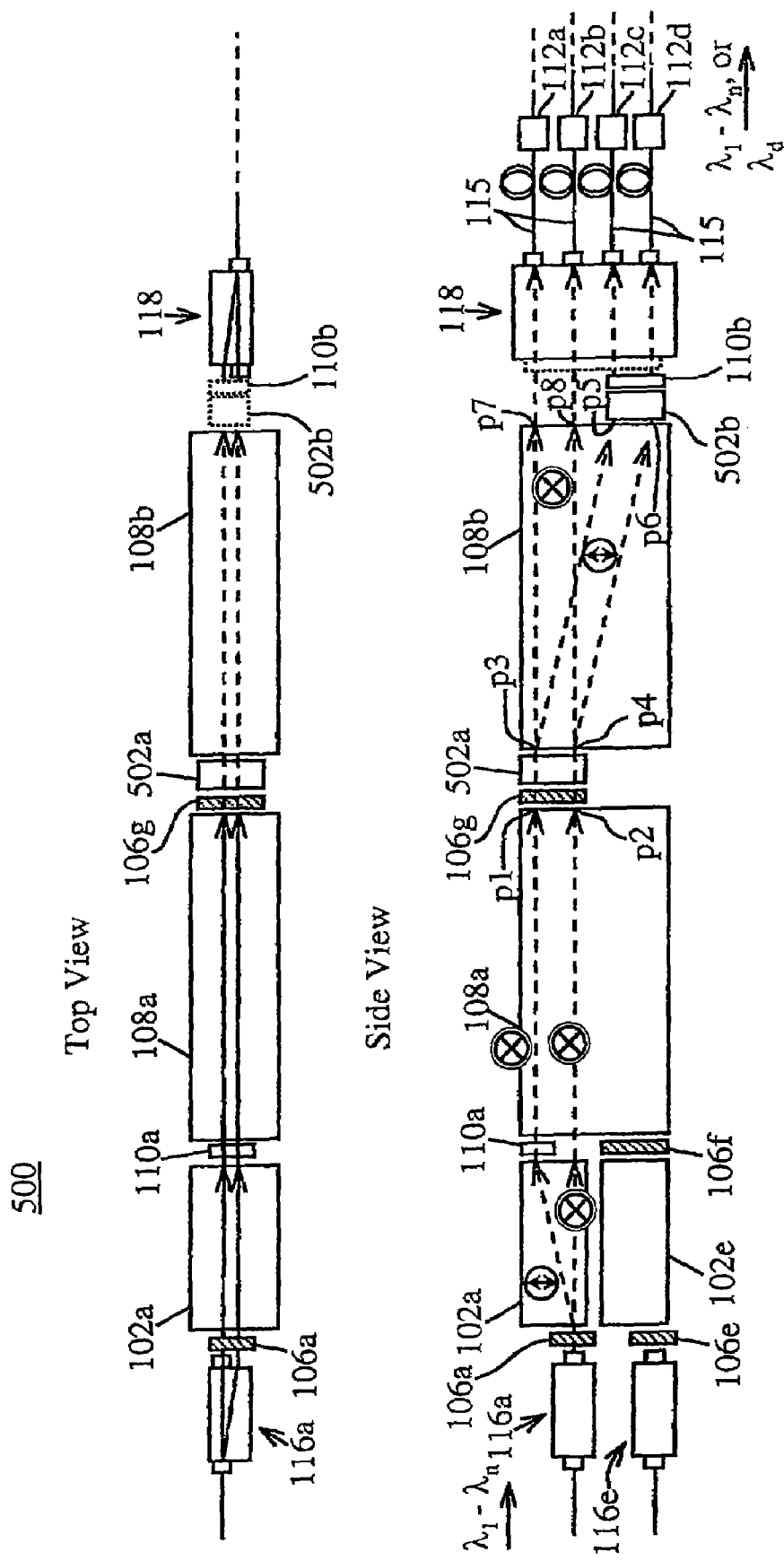
FIG. 5A is an illustration of a ninth preferred embodiment of a tunable filter in accordance with the present invention, the tunable filter further operating as re-configurable channel dropping de-multiplexer.
Figure 5B:
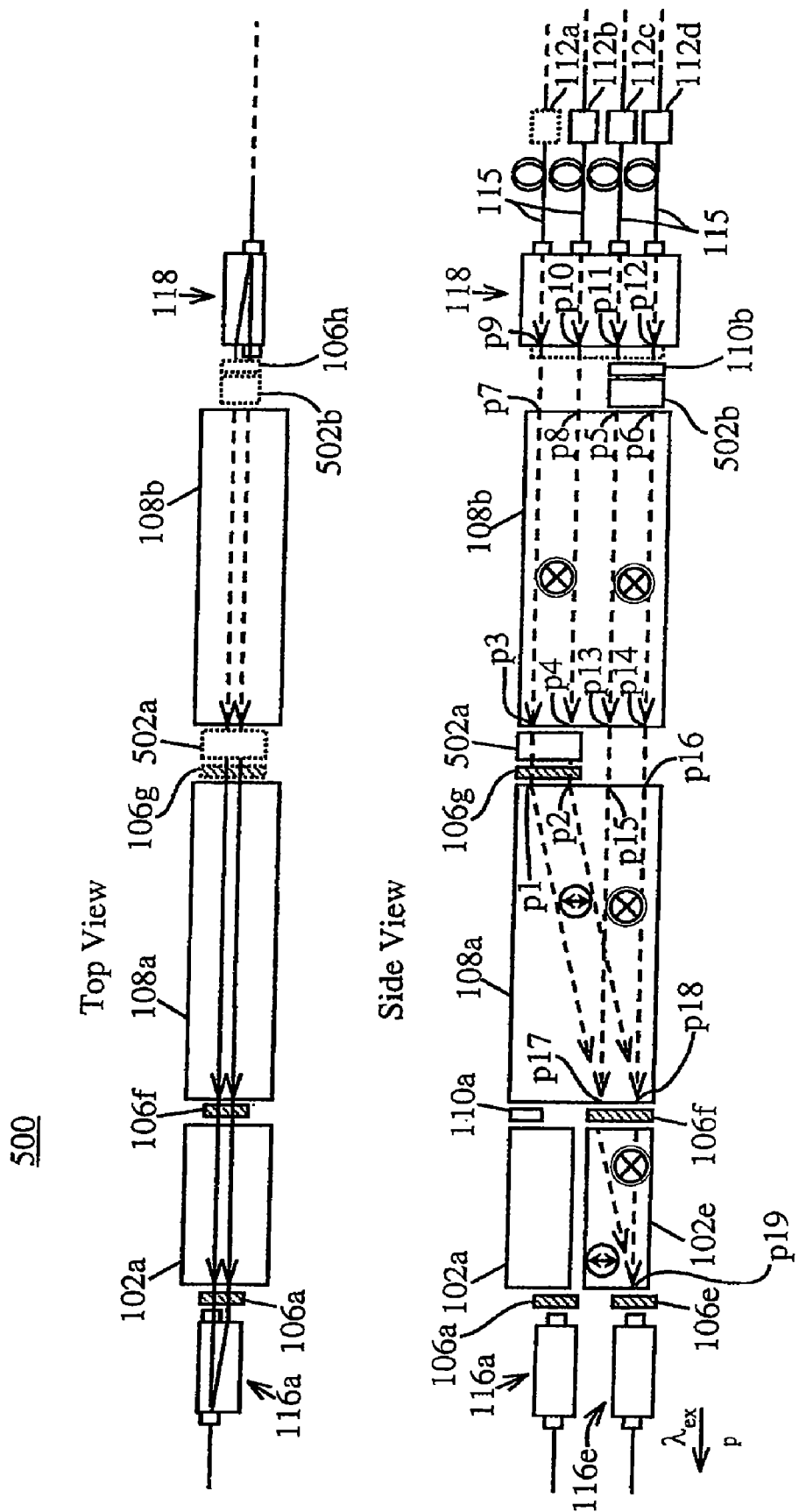
FIG. 5B is an illustration of the tunable filter of FIG. 5A, showing the pathways of reflected channels.

FIGS. 5A-5B together illustrate a ninth preferred embodiment of a tunable filter in accordance with the present invention, wherein the tunable filter further operates as an optical add drop multiplexer. The tunable filter 500 illustrated in FIGS. 5A-5B comprises a polarizing input port 116a, a polarizing output port 116e, a first 102a and a second 102e single-walk-off birefringent walk-off plate, a first 108a and a second 108b double-walk-off birefringent walk-off plate, and a multiple-output polarizing output port 118. The tunable filter 500 further comprises a first polarization modulator 106a optically coupled between the polarizing input port 116a and the first single-walk-off birefringent walk-off plate 102a, a second polarization modulator 106e optically coupled between the polarizing output port 116e and the second single-walk-off birefringent walk-off plate 102e, a first reciprocal optical polarization rotator 110a, preferably a half-wave plate, optically coupled between the first single-walk-off birefringent walk-off plate 102a and the first double-walk-off birefringent walk-off plate 108a, a third polarization modulator 106f optically coupled between the second single-walk-off birefringent walk-off plate 102e and the first double-walk-off birefringent walk-off plate 108a, a fourth polarization modulator 106g and a first isolator core 502a both optically coupled between the first 108a and second 108b double-walk-off birefringent walk-off plates and a second reciprocal optical polarization rotator 110b and a second isolator core 502b both optically coupled between the second double-walk-off birefringent walk-off plate 108b and the multiple-output polarizing output port 118. The tunable filter 500 further comprises a plurality of optical fibers 115 optically coupled to the multiple-output polarizing output port 118 and a plurality of optical band pass filter assemblies 112a-112c optically coupled to the optical fibers, each optical band pass filter assembly transmitting a different respective wavelength channel.

Figure 5C:
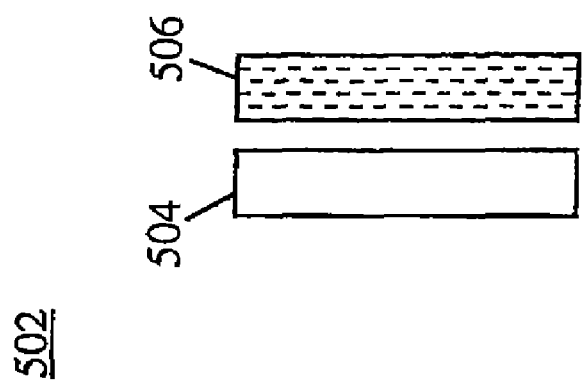
FIG. 5C is an illustration of an isolator core stricture as utilized within the tunable filter of FIG. 5A.

The term "isolator core" as used herein, refers to a component, as shown in FIG. 5C, that comprises a non-reciprocal optical polarization rotator 506 optically coupled to a reciprocal optical polarization rotator 504. The non-reciprocal optical polarization rotator 506 may comprise a Faraday rotator; the reciprocal optical polarization rotator 504 may comprise a half-wave plate. This combination of optical polarization rotators, as shown in FIG. 5C, is well known in the art and is frequently used in the construction of optical circulators and isolators. It is well known that this combination of a reciprocal and non-reciprocal optical rotator may be configured such that the polarization of linearly polarized light propagating, through the isolator core in a forward direction, for instance, left to right, will be rotated by ninety degrees whilst the polarization of linearly polarized light propagating through the isolator core in a reverse direction, for instance, right to left, will not be rotated.

FIG. 5A shows alternative pathways of optical channels through the tunable filter 500 from the polarizing input port 116a to the multiple-output polarizing output port 118. FIG. 5B shows alternative pathways of optical channels through the tunable filter 500 from the multiple-output polarizing output port 118 to the polarizing output port 116e. For instance, the Side View of FIG. 5A shows that the first polarization modulator 106a may be configured so as to either rotate or not rotate the polarization plane orientation of channels received from the polarizing input port 116a. Therefore the polarization plane orientation of the light of channels entering the first single-walk-off birefringent plate 102a may be either vertical (i.e., parallel to the left side of the drawing page) or else perpendicular to the plane of the Side View drawing. If the polarization plane is vertical within the first single-walk-off birefringent plate 102a, then the channel light follows the uppermost path as shown and is shifted so as to pass through the first reciprocal optical rotator 110a. If, on the other hand, the polarization plane orientation is perpendicular to the plane of the Side View drawing, then the light of the channels follows the lowermost path within the first single-walk-off birefringent plate 102a and bypasses the first reciprocal optical polarization rotator 110a.

The first reciprocal optical polarization rotator 110a comprising the tunable filter 500 rotates the polarization plane of light on the upper most path shown in FIG. 5A so as to be oriented perpendicular to the plane of the Side View drawing. Therefore, the light comprising the channels is polarized perpendicular to the plane of the Side View drawing upon passing through the first double-walk-off birefringent plate 108a shown in FIG. 5A, regardless of whether this light travels along the uppermost or the lowermost shown path through the first double-walk-off birefringent plate 108a. Because of this polarization of light passing through the first double-walk-off birefringent plate 108a, the light propagates without shift or deflection so as to pass into and through both the fourth polarization modulator 106g and the first isolator core 502a.

The fourth polarization modulator 106g may be configured so as to either rotate or not rotate the polarization plane orientation of channels received from the first double-walk-off birefringent plate 108a. For purposes of this example, it may be assumed that the first isolator core 502a does not rotate the polarization plane orientation of light passing therethrough from left to right. Therefore, the polarization plane orientation of the light of channels entering and passing through the second double-walk-off birefringent plate 108b is determined by the configuration or controlled state of the fourth polarization modulator and may be either vertical or else perpendicular to the plane of the Side View drawing. In the first such case, the vertically polarized light passing through the second double-walk-off birefringent plate 108b is shifted or deflected diagonally downward by at least two beam diameters. The vertically polarized light entering the second double-walk-off birefringent plate 108b at point p3 is deflected to point p5 and the vertically polarized light entering the second double-walk-off birefringent plate 108b at point p4 is deflected to point p6. If the light comprising the channels passes through the second double-walk-off birefringent plate 108b with polarization oriented perpendicular to the plane of the Side View drawing, then this light is not shifted or deflected and exits the second double-walk-off birefringent plate 108b at eight point p7 or point p8.

If the light comprising the channels exits the second double-walk-off birefringent plate 102b at either the point p7 or the point p8, then it passes into and through the multiple-output polarizing output port 118 to the first 112a or the second 112b optical band pass filter assembly, respectively. If the light comprising the channels exits the second double-walk-off birefringent plate 102b at either the point p5 or the point p6, then it passes through the second isolator core 502b and through the second reciprocal optical polarization rotator 110b before passing through the multiple-output polarizing output port 118 to the third 112c or the fourth 112d optical band pass filter assembly, respectively. For purposes of this example, it may be assumed that the second isolator core 502b does not rotate the polarization plane orientation of light passing therethrough from left to right. Therefore, under this assumption, immediately after emerging from the second isolator core 502b, the light will be vertically polarized. Since, in this particular example, the multiple-output polarizing output port 118 cannot accept light of this polarization, the second reciprocal optical polarization rotator 110b must be present so as to rotate the light polarization into an orientation that can be accepted by the multiple-output polarizing output port 118. If, on the other hand, the multiple-output polarizing output port 118 can accept the polarization orientation of the light emerging from the second isolator core 502b, then the second reciprocal optical rotator may be omitted.

In operation of the tunable filter 500 (FIGS. 5A-5B), the light comprising the channels $\lambda_1$-$\lambda_n$ is directed to only one of the optical band pass filter assemblies 112a-112d. A single one of the channels $\lambda_d$ is transmitted through the optical band pass filter assembly as previously discussed. The remaining express channels $\lambda_{exp}$, which comprise all of the original channels except for $\lambda_d$ are reflected from the optical band pass filter assembly back through one of the optical fibers 115 to the multiple-output polarizing output port 118. These reflected express channels then emerge from the multiple-output polarizing output port 118 at one of the points p9-p12 as shown in FIG. 5B. It is assumed, for purposes of the example shown in FIGS. 5A-5B that the light comprising these reflected express channels emerges from the multiple-output polarizing output port 118 having a linear polarization oriented perpendicular to the plane of the drawing of FIG. 5B. If the reflected express channels emerge from either point p9 or point p10, they proceed directly to enter the second double-walk-off birefringent plate 108b at either point p7 or p8, respectively. If the reflected express channels emerge from either point p11 or point p12 of the multiple-output polarizing output port 118, then these channels pass through the second reciprocal optical rotator 110b and the second isolator core 502b before passing into the second double-walk-off birefringent plate 108b at either point p5 or p6, respectively. It is assumed, for purposes of this example, that the second isolator core 502b rotates, by 90 degrees, the polarization of light passing therethrough from right to left. The second reciprocal optical rotator 110b also rotates the light polarization, by an additional 90 degrees. Therefore, the combination of passing through both the second isolator core 502b and the second reciprocal optical rotator 110b in succession leaves the light polarization plane oriented perpendicular to the plane of FIG. 5B, as is required for un-shifted passage through the second double-walk-off birefringent plate 108b.

From the previous discussion, the light of the express channels passing through the second double-walk-off birefringent plate 108b of the tunable filter 500 from right to left is polarized perpendicularly to the plane of the Side View drawing, regardless of whether it enters the second double-walk-off birefringent plate 108b at point p5, p6, p7 or p8, as is indicated in FIG. 5B. Light having such a polarization plane orientation passes through the second double-walk-off birefringent plate 108b without shift or deflection. Thus the light of the express channels will pass either from point p7 to point p3, from point p8 to point p4, from point p5 to point p13, or from point p6 to point p14 as shown in FIG. 5B. If the light of the reflected express channels emerges from the second double-walk-off birefringent plate 108b at either point p13 or point p14, it proceeds, without any change in polarization to enter the first double-walk-off birefringent plate 108a at either point p15 or p16, respectively. The express channels then further proceed undeflected within the first double-walk-off birefringent plate 108a from either point p15 to point p17 or from point p16 to point p18.

If the light of the reflected express channels emerges from the second double-walk-off birefringent plate 108b at either point p3 or point p4 (FIG. 5B), it then proceeds through the first isolator core 502a and the fourth polarization modulator 106g before entering the first double-walk-off birefringent plate 108a at either point p1 or p2, respectively. It is assumed, for purposes of this example, that the first isolator core 502a rotates, by 90 degrees, the polarization of light passing therethrough from right to left. If light emerges from the point p3 or point p4, then it will be the case that the fourth polarization modulator 106g is configured so as to not rotate the light polarization, as has been previously described with reference to FIG. 5A. The previous statement is true because the express channels in question previously passed, without change in polarization, from left to right either from point p1 to point p3 and then to point p7 or from point p2 to p4 and then to point p8. Therefore, after passing through both the first isolator core 502a and the fourth polarization modulator 106g to either point p1 or p2, the polarization plane of the light comprising the reflected express channels is oriented vertically. This vertically polarized light is shifted or deflected within the first double-walk-off birefringent plate 108a so as to propagate either from point p1 to point p17 or from point p2 to point p18 as shown in FIG. 5B.

The light comprising the reflected express channels arriving at either point p17 or point p18 (FIG. 5B), may be either vertically polarized or else polarized perpendicularly to the plane of the Side View drawing. If the light arrives at point p17 and is polarized perpendicularly to the plane of the drawing or else arrives at point p18 and is polarized vertically, then the third polarization modulator 106f is configured so as to rotate the polarization plane by 90 degrees. Conversely, if the light arrives at point p17 and is polarized vertically or else arrives at point p18 and is polarized perpendicularly to the plane of the Side View drawing, then the third polarization modulator 106f is configured so as to leave the polarization unchanged. In this fashion, the configuration of the third polarization modulator 106f causes the polarization of the reflected express channels to be such that these reflected express channels always propagate to point p19 as they exit the second single-walk-off birefringent walk-off plate 102e and subsequently pass through the second polarization modulator 106e. The second polarization modulator 106e adjusts the polarization of the reflected express channels as required- either rotating the polarization by 90 degrees or leaving the polarization unchanged-so that these reflected express channels have the correct polarization to be accepted into the polarizing output port 116e.

Figure 8:
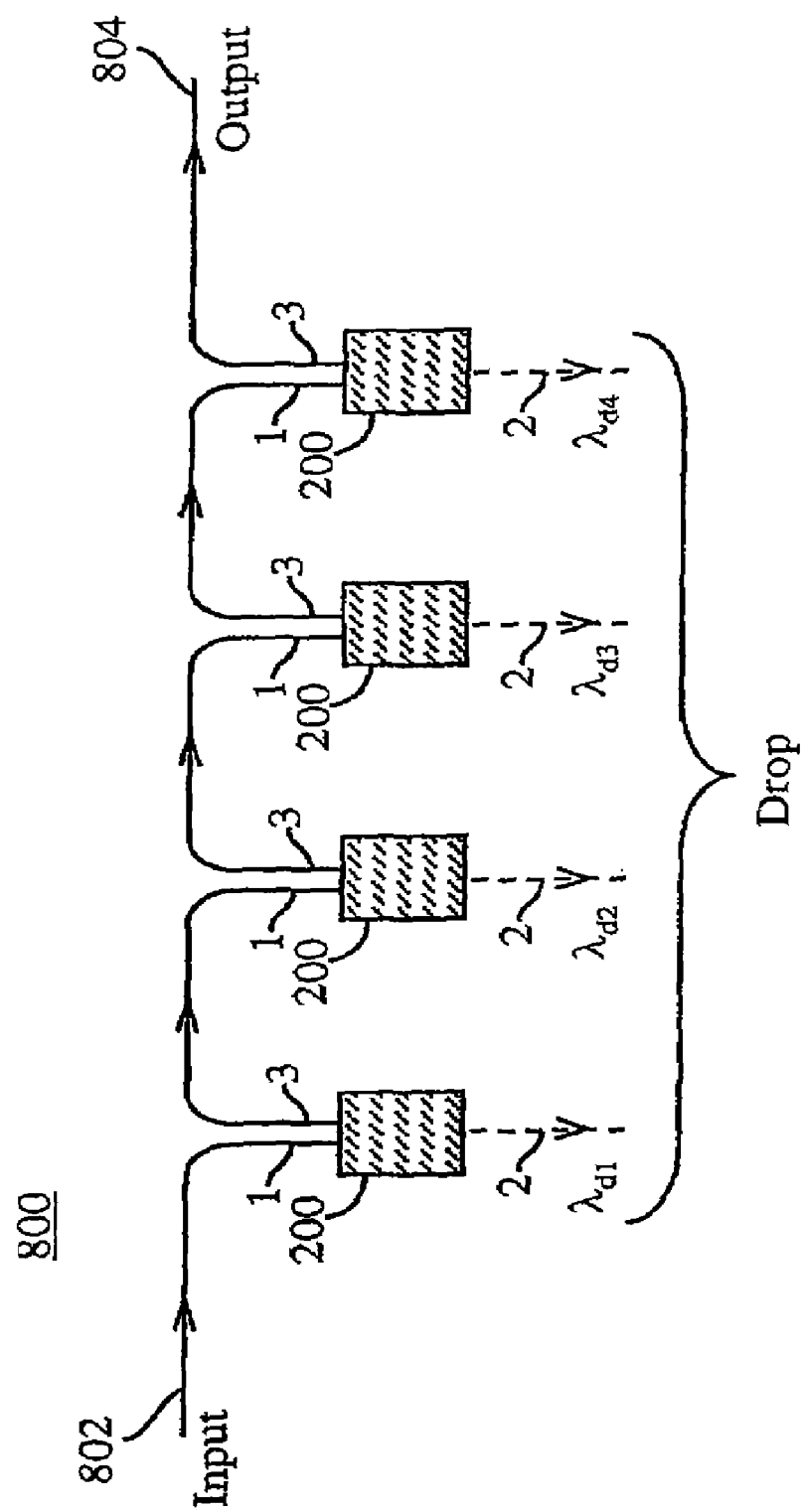
FIG. 8 is an illustration of a system for a re-configurable channel dropping de-multiplexer in accordance with the present invention.

FIG. 8 is an illustration of a re-configurable channel dropping de-multiplexer system in accordance with the present invention. The system 800 shown in FIG. 8 comprises a serial cascade arrangement in which a plurality of re-configurable channel dropping de-multiplexers are sequentially optically coupled such that the input 1 of the first de-multiplexer 200 in the sequence is optically coupled to an input optical line 802, the express channel output 3 of the last de-multiplexer 200 in the sequence is optically coupled to an output optical line 804 and the express channel output 3 of each de-multiplexer 200 except for the last in the sequence is optically coupled to the input 1 of the subsequent de-multiplexer 200 in the sequence. The dropped channel output 2 of each re-configurable channel dropping de-multiplexer 200 in the sequence comprising the system 800 may carry a different respective individual dropped channel. Each such dropped channel may be selected at each one of the re-configurable channel dropping de-multiplexers 200 comprising the system 800. The system 800 permits several selected channels to be removed or dropped from a composite optical signal received from the input optical line 800. Each one of the re-configurable channel dropping de-multiplexers 200 may be any of the embodiments previously discussed herein, or may be an apparatus having equivalent functionality to these embodiments.

Although the present invention has been disclosed in accordance with the embodiments shown, one of ordinary skill in the alt will readily recognize that there could be variations to the embodiments shown and those variations would be within the spirit and scope of the present invention. Accordingly, many modifications may be made by one of ordinary skill in the art without departing from the scope of the invention. which is defined by the claims appended hereto.

The invention claimed is:

1. A tunable optical filter comprising:
a first optical switch having a single first optical port and a plurality of second optical ports;
a plurality of band pass filters, each one of the band pass filters optically coupled to a respective second optical port; and
a second optical switch having a plurality of third optical ports and a single fourth optical port, each third optical port optically coupled to a respective band pass filter, wherein the first optical switch delivers a plurality of optical channels to a selected one of the band pass filters, the selected band pass filter transmitting a single selected optical channel to a third port and wherein all channels of the plurality of optical channels other than the single selected optical channel are reflected by the selected band pass filter to one of the second optical ports and routed to the first optical port.

2. The tunable optical filter of claim 1, wherein each band pass filter is a thin-film filter.

3. The tunable optical filter of claim 1, wherein the first optical switch is a 1×4 switch.

4. A tunable optical filter comprising:
a first optical switch having a single first optical port and a plurality of second optical ports;
a graded band pass filter optically coupled to the plurality of second optical ports; and
a second optical switch having a plurality of third optical ports and a single fourth optical port, the plurality of third optical ports optically coupled to the graded band pass filter, wherein the first optical switch delivers a plurality of optical channels to a selected portion of the graded band pass filter, the selected portion of the graded band pass filter transmitting a single selected optical channel to a third port and wherein all channels of the plurality of optical channels other than the single selected optical channel are reflected by the selected portion of the graded band pass filter to one of the second optical ports and routed to the first optical port.

5. A method for a tunable optical filter comprising:
receiving a plurality of optical channels at a first optical port of an optical switch;
routing the plurality of optical channels to a selected one of a plurality of second optical ports of the optical switch;
routing the plurality of optical channels to a band pass filter optically coupled to the selected second optical port;
transmitting a selected optical channel of the plurality of optical channels to a selected one of a plurality of third optical ports of a second optical switch, wherein all channels of the plurality of optical channels other than the selected optical channel are reflected by the band pass filter to one of the second optical ports and routed to the first optical port; and
routing the selected optical channel to a fourth optical port of the second optical switch.

6. A method for a tunable optical filter comprising:
receiving a first plurality of optical channels at a first port of a first optical switch and a second plurality of optical channels at a first port of a second optical switch;
routing the first plurality of optical channels to a selected one of a plurality of second ports of the first optical switch and the second plurality of optical channels to a selected one of a plurality of second ports of the second optical switch;
routing the first plurality of optical channels and the second plurality of channels to a band pass filter optically coupled to the selected second port of the first optical switch and to the selected second port of the second optical switch;
transmitting a first selected optical channel of the first plurality of optical channels to the selected second port of the second optical switch and another selected optical channel of the second plurality of optical channels to the selected second port of the first optical switch; and
routing the first selected optical channel to the first port of the second optical switch and the other selected optical channel to the first port of the first optical switch.

7. A tunable optical filter comprising:
a first optical switch having a single first optical port and a plurality of second optical ports;
a plurality of band pass filters, each one of the band pass filters optically coupled to a respective second optical port; and
a second optical switch having a plurality of third optical ports and a single fourth optical port, each third optical port optically coupled to a respective band pass filter, wherein the first optical switch delivers a first plurality of optical channels to a selected one of the band pass filters, the selected band pass filter transmitting a single selected optical channel from the first plurality of optical channels to a third port and wherein the second optical switch delivers a second plurality of optical channels to the selected band pass filter, the selected band pass filter transmitting a single selected optical channel from the second plurality of optical channels to a second port.

8. A tunable optical filter comprising:
a first optical switch having a single first optical port and a plurality of second optical ports;
a graded band pass filter optically coupled to the plurality of second optical ports; and
a second optical switch having a plurality of third optical ports and a single fourth optical port, the plurality of third optical ports optically coupled to the graded band pass filter, wherein the first optical switch delivers a first plurality of optical channels to a selected portion of the graded band pass filter, the selected portion of the graded band pass filter transmitting a single selected optical channel from the first plurality of optical channels to a third port and wherein the second optical switch delivers a second plurality of optical channels to the selected portion of the graded band pass filter, the selected portion of the graded band pass filter transmitting a single selected optical channel from the second plurality of optical channels to a second port.

* * * * *